United States Patent
Jang et al.

(10) Patent No.: US 9,259,129 B2
(45) Date of Patent: *Feb. 16, 2016

(54) AUTONOMOUS CLEANER AND METHOD OF CONTROLLING THE SAME

(75) Inventors: Hwi Chan Jang, Yongin-si (KR); Dong Won Kim, Hwaseong-si (KR); Hyun Soo Jung, Seongnam-si (KR); Seung Il Han, Sosa-gu (KR); Jun Hwa Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 431 days.

This patent is subject to a terminal disclaimer.

(21) Appl. No.: 13/557,707

(22) Filed: Jul. 25, 2012

(65) Prior Publication Data

US 2013/0054022 A1 Feb. 28, 2013

(30) Foreign Application Priority Data

Aug. 22, 2011 (KR) .......................... 10-2011-0083598

(51) Int. Cl.
G06F 19/00 (2011.01)
A47L 9/28 (2006.01)

(52) U.S. Cl.
CPC ........... *A47L 9/2805* (2013.01); *A47L 2201/04* (2013.01)

(58) Field of Classification Search
CPC ............. A47L 2201/04; G05D 1/0227; G05D 2201/0203
USPC ...................................... 700/245, 258; 901/1
See application file for complete search history.

(56) References Cited

U.S. PATENT DOCUMENTS

| | | | | |
|---|---|---|---|---|
| 6,047,244 A * | 4/2000 | Rud, Jr. ................. | G01D 3/024 |
| | | | | 375/295 |
| 7,188,000 B2 * | 3/2007 | Chiappetta ........... | G05D 1/0242 |
| | | | | 15/319 |
| 7,275,280 B2 * | 10/2007 | Haegermarck .......... | A47L 9/009 |
| | | | | 15/319 |

(Continued)

FOREIGN PATENT DOCUMENTS

| | | |
|---|---|---|
| CN | 1401289 | 3/2003 |
| CN | 1636491 | 7/2005 |

(Continued)

OTHER PUBLICATIONS

U.S. Office Action issued Jun. 24, 2014 in related U.S. Appl. No. 13/590,720.

(Continued)

*Primary Examiner* — Khoi Tran
*Assistant Examiner* — Jorge Peche
(74) *Attorney, Agent, or Firm* — Staas & Halsey LLP

(57) ABSTRACT

An autonomous cleaner has an enhanced structure capable of conducting an efficient cleaning task according to the material quality or the condition of the floor surface of a cleaning space.
The autonomous cleaner includes a body, a driving wheel to drive the body, a driving wheel assembly having the driving wheel, and a control unit. The control unit detects a displacement of the driving wheel corresponding to a reference position by sensing a sensor target, determines material quality or condition of a floor surface according to the displacement of the driving wheel, and controls the driving of the autonomous cleaner according to the determined material quality or the condition of the floor surface.

29 Claims, 60 Drawing Sheets

(56) References Cited

U.S. PATENT DOCUMENTS

| | | | | |
|---|---|---|---|---|
| 7,441,298 B2* | 10/2008 | Svendsen | A47L 5/30 15/319 |
| 7,555,363 B2* | 6/2009 | Augenbraun | A47L 5/225 134/18 |
| 7,581,282 B2* | 9/2009 | Woo | A47L 9/009 15/319 |
| 7,861,365 B2* | 1/2011 | Sun | A47L 5/14 15/319 |
| 8,253,368 B2* | 8/2012 | Landry | A47L 9/2805 15/319 |
| 8,386,081 B2* | 2/2013 | Landry | G05D 1/0272 318/568.12 |
| 8,417,383 B2* | 4/2013 | Ozick | G05D 1/0231 700/245 |
| 8,428,778 B2* | 4/2013 | Landry | A47L 11/4011 318/568.12 |
| 8,560,119 B2* | 10/2013 | Lee | A47L 11/33 15/319 |
| 8,781,626 B2* | 7/2014 | Landry | A47L 11/4011 318/568.12 |
| 2001/0008985 A1* | 7/2001 | Wada | G05D 1/0272 701/1 |
| 2004/0211444 A1* | 10/2004 | Taylor | A47L 9/2805 134/18 |
| 2004/0236468 A1* | 11/2004 | Taylor | A47L 9/2805 700/245 |
| 2004/0244138 A1* | 12/2004 | Taylor | A47L 9/2805 15/319 |
| 2005/0132522 A1* | 6/2005 | Im | A47L 9/009 15/319 |
| 2006/0060216 A1* | 3/2006 | Woo | A47L 9/0009 134/18 |
| 2006/0111814 A1* | 5/2006 | Hachitani | G05D 1/027 700/258 |
| 2007/0016328 A1* | 1/2007 | Ziegler | A47L 5/14 700/245 |
| 2007/0233321 A1* | 10/2007 | Suzuki | G05D 1/0255 700/245 |
| 2008/0065265 A1* | 3/2008 | Ozick | G05D 1/0231 700/245 |
| 2008/0282484 A1 | 11/2008 | Lai et al. | |
| 2009/0071732 A1* | 3/2009 | Kim | B60G 3/01 180/24.07 |
| 2009/0254218 A1* | 10/2009 | Sandin | G05D 1/028 700/258 |
| 2010/0037418 A1* | 2/2010 | Hussey | A47L 5/30 15/319 |
| 2010/0115716 A1* | 5/2010 | Landry | A47L 9/2805 15/3 |
| 2010/0324734 A1* | 12/2010 | Lee | A47L 11/33 700/258 |
| 2012/0125363 A1* | 5/2012 | Kim | A47L 9/28 134/6 |
| 2013/0211589 A1* | 8/2013 | Landry | A47L 11/4011 700/253 |

FOREIGN PATENT DOCUMENTS

| | | | |
|---|---|---|---|
| CN | 102119092 | | 7/2011 |
| EP | 1 931 010 A2 | | 6/2008 |
| WO | WO 2006/089307 A2 | | 8/2006 |
| WO | WO 2007/065034 A1 | | 6/2007 |
| WO | WO 2010018530 A1 * | 2/2010 | G05D 1/0227 |

OTHER PUBLICATIONS

U.S. Office Action issued Dec. 3, 2014 in related U.S. Appl. No. 13/590,720.

U.S. Office Action issued Aug. 4, 2015 in related U.S. Appl. No. 13/590,720.

European Search Report issued Jan. 3, 2013 in corresponding European Patent Application No. 12180676.4.

U.S. Appl. No. 13/590,720, filed Aug. 21, 2012, Hwi Chan Jang, Samsung Electronics Co., Ltd.

Chinese Office Action issued Oct. 23, 2015 in corresponding Chinese Patent Application No. 201210295618.6.

\* cited by examiner

AUTONOMOUS CLEANER AND METHOD OF CONTROLLING THE SAME

CROSS-REFERENCE TO RELATED APPLICATION

This application claims the benefit of Korean Patent Application No. 2011-0083598, filed on Aug. 22, 2011 in the Korean Intellectual Property Office, the disclosure of which is incorporated herein by reference.

BACKGROUND

1. Field

Embodiments relate to an autonomous cleaner capable of conducting a cleaning according to material quality or condition of a floor surface, and a method of controlling thereof 2. Description of the Related Art In general, an autonomous cleaner is a cleaning apparatus which automatically cleans an area intended to be cleaned without the control of a user while independently driving in the area to be cleaned by taking in foreign substances such as dust. Such an autonomous cleaner, through various sensors, etc., detects the distance to obstacles such as furniture, office equipment, or a wall within a cleaning area, and cleans the area while driving such that, by using the information detected, a collision with the obstacle may be avoided.

The cleaning of the area using the autonomous cleaner refers to a process of the autonomous cleaner repeatedly conducting a cleaning task while driving according to a pre-established driving pattern.

The area which the autonomous cleaner cleans while driving may not have a uniform material quality or condition, etc. on the surface, and in order to efficiently clean the cleaning area, the driving method or the cleaning strength may be varied according to the material quality or the condition of the floor surface. For example, in a case of a soft floor such as a carpet, since driving resistance is large and more dust is contained in the soft floor when compared with a hard floor such as a wooden floor, the intake force and driving speed of the autonomous cleaner must be increased, and in case of a tile, since a groove is formed at regular intervals, the concentrated dust in the groove must be completely eliminated when the autonomous cleaner passes the groove. In a case when the autonomous cleaner passes an intersection between floor surfaces having different material quality or condition to each other, the entry angle and the driving speed must be controlled differently for the autonomous cleaner to drive smoothly, and not to simultaneously drive on the floor surface having different material quality or condition to each other.

In addition, obstacles such as a raised area, an object having an inclined plane, furniture, etc may exist on the area where the autonomous cleaner cleans while operating. Such obstacles may cause the driving wheels of the autonomous cleaner to become elevated (hereafter called "elevation") or the autonomous cleaner to be unable to drive as the body of the autonomous cleaner is caught in a narrow space (hereafter called "caught-in").

A conventional autonomous cleaner is not equipped with a sensor capable of sensing such an elevation or caught-in condition, or a condition when the autonomous cleaner is not able to drive because an elevation or the caught-in condition has already occurred. Instead a conventional autonomous cleaner is at best equipped with a sensor only capable of conducting a very limited function in stopping the operation of the autonomous cleaner by sensing a that the autonomous cleaner is unable to drive, thereby having a problem in driving while avoiding the obstacles before the elevation or the caught-in phenomenon occurs, or in driving by effectively overcoming the obstacles.

SUMMARY

Therefore, it is an aspect to provide an autonomous cleaner which is configured to have an enhanced structure capable of conducting an efficient cleaning task according to the material quality or the condition of the floor surface of a cleaning space, and a method of controlling thereof.

It is another aspect to provide an autonomous cleaner which is configured to have an enhanced structure capable of conducting a cleaning task without a discontinuation of a driving by the obstacles that exist in a cleaning space, and a method of controlling thereof.

Additional aspects of the invention will be set forth in part in the description which follows and, in part, will be obvious from the description, or may be learned by practice of the invention.

In accordance with one aspect, a method of controlling an autonomous cleaner which may include a body, a driving wheel to drive the body, and a driving wheel assembly having the driving wheel may detect by a sensor a displacement of the driving wheel corresponding to a reference position by sensing a sensor target, may determine material quality or condition of a floor surface according to the displacement of the driving wheel, and may control the driving of the autonomous cleaner according to the determined material quality or the condition of the floor surface.

The sensor may be capable of sensing a gap distance between the sensor and the sensor target.

When the gap distance between the sensor and the sensor target is maintained at a constant value, it may be determined that the autonomous cleaner is driving on a hard floor area.

When the gap distance between the sensor and the sensor target is substantially changed while having a constant period, it may be determined that the autonomous cleaner is driving on a tile area.

When the gap distance between the sensor and the sensor target is continuously fluctuating within a constant range, it may be determined that the autonomous cleaner is driving on a carpet area.

When the gap distance between the sensor and the sensor target is substantially increased or substantially decreased, it may be determined that the autonomous cleaner is driving on an intersecting area of the H/F area and the carpet area, or on a raised area.

The torque or the rotation frequency of the driving wheel may be adjusted according to the determined material quality or the condition of the floor surface.

The determination may be made whether the displacement is within a predetermined reference range, and the driving course of the autonomous cleaner may be changed for the displacement to enter within the reference range when the determination is made that the displacement is out of the reference range.

The sensor target may be the driving wheel.

In accordance with another aspect, an autonomous cleaner which may include a body, a driving wheel to drives the body, and a driving wheel assembly having the driving wheel may include a sensor target provided at the driving wheel assembly; a sensor configured to sense a displacement of the driving wheel corresponding to a reference position by sensing the sensor target; and a control unit configured to determine material quality or condition of a floor surface according to the displacement of the driving wheel, and to control the driving of the autonomous cleaner according to the material quality or the condition of the floor surface determined.

The control unit, when the displacement of the driving wheel is maintained at a constant value, may be capable of determining that the autonomous cleaner is driving on a hard floor area.

The control unit, when the displacement of the driving wheel is substantially changed while having a constant period, may be capable of determining that the autonomous cleaner is driving on a tile area.

The control unit, when the displacement of the driving wheel is continuously fluctuating within a constant range, may be capable of determining that the autonomous cleaner is driving on a carpet area.

The control unit, when the displacement of the driving wheel is substantially increased or substantially decreased, may be capable of determining that the autonomous cleaner is driving on an intersecting area of the hard floor area and the carpet area, or on a raised area.

The control unit, while the determination is being made whether the displacement of the driving wheel is within a predetermined reference range and in a case when it is determined that the displacement of the driving wheel is out of the reference range, may be capable of changing the driving course of the autonomous cleaner so that the displacement enters within the reference range.

The control unit, when the displacement of the driving wheel is continuously increased while having a positive (+) value, may determine that the autonomous cleaner is driving over a drive-over obstacle, and when the displacement of the driving wheel is continuously increased and reaches the established maximum threshold value, may be capable of controlling the autonomous cleaner to drive while avoiding the drive-over obstacle.

The control unit, when the displacement of the driving wheel is continuously decreased while having a negative (−) value, may determine that the autonomous cleaner is passing the caught-in obstacle, and when the displacement of the driving wheel is continuously increased and reaches the established minimum threshold value, may be capable of controlling the autonomous cleaner to drive while avoiding the caught-in obstacle.

The control unit may provide a map with reference to the area where the autonomous cleaner drives according to the displacement pattern of the driving wheel detected by the sensor, and the hard floor area, the tile area, the carpet area, the intersecting area, the raised area, the drive-over obstacle, the caught-in obstacle, etc. may be encoded on the map.

The control unit may be capable of controlling the autonomous cleaner to drive in a direction perpendicular to a longitudinal direction of the intersecting area or the raised area by using the map.

The control unit may be capable of controlling the autonomous cleaner not to simultaneously drive on areas having different material quality to each other by using the map.

The control unit may be capable of controlling the autonomous cleaner to drive while avoiding the drive-over obstacle or the caught-in obstacle by using the map.

The sensor may be capable of detecting the gap distance between the sensor and the sensor target.

The sensor target may be the driving wheel.

In accordance with another aspect, an autonomous cleaner which includes a body, a driving wheel to drive the body, and a driving wheel assembly having the driving wheel may include a subject of a sensor provided at the driving wheel assembly; a sensor configured to sense a displacement of the driving wheel corresponding to a reference position by sensing the sensor target; and a control unit configured to determine material quality or condition of a floor surface according to the displacement pattern of the driving wheel, and to provide a map which encodes the determined material quality or the condition of the floor surface.

The control unit, when the autonomous cleaner conducts a cleaning on the area on which the map is provided, may be capable of differently controlling the driving of the autonomous cleaner according to the material quality or the condition of the floor surface which may be encoded on the map.

The control unit may determine a type of an obstacle according to the displacement pattern of the driving wheel, and may be capable of preparing a map which encodes the type and location of the determined obstacle.

The control unit, when the autonomous cleaner conducts a cleaning on the area on which the map is provided, may be capable of controlling the autonomous cleaner to drive while avoiding the obstacle which is encoded on the map.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
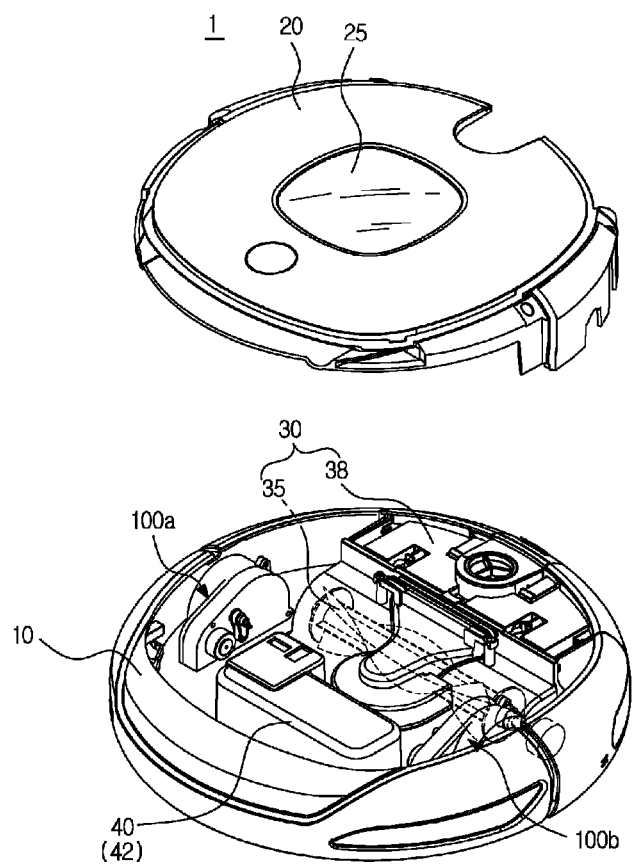
FIG. 1 is a view illustrating a structure of an autonomous cleaner in accordance with a first embodiment of the present disclosure.

Reference will now be made in detail to the embodiments, examples of which are illustrated in the accompanying drawings, wherein like reference numerals refer to like elements throughout.

FIG. 1 is a view illustrating a structure of an autonomous cleaner in accordance with a first embodiment of the present disclosure.

Referring to FIG. 1, the autonomous cleaner 1 may include a body 10, a cover 20 which may be configured to cover an upper portion of the body 10, a brush unit 30 which may be configured to sweep or scatter dust that exists in a cleaning area, a power unit 40 which may be configured to supply driving power for driving the body 10, and a driving wheel assembly 100A and 100B which may be configured to drive the body 10.

The body 10, while forming an exterior of the autonomous cleaner 1, may be configured to support various components which may be installed inside the body 10.

The cover 20 may include a window 25 which may be configured to transmit light generated by a camera unit (not shown) which may be configured to photograph an image toward the driving direction of the body 10.

The brush unit 30 may include a main brush 35 which may be installed at an inlet port (not shown) formed at a lower portion of the body 10, a main brush motor (not shown) which may be configured to rotate the main brush 35, and a dust container 38 which may gather foreign substance such as dust, etc. collected by the main brush 35.

The main brush 35, by sweeping or scattering the dust on the bottom surface of the lower portion of the body 10, may improve the intake efficiency. Such a main brush 35 may be formed in a shape of a drum, and may be composed of a roller and a brush. Although not illustrated, the brush unit 30, in order to improve a cleaning efficiency, may further include a side brush (not shown) which may be arranged at each side of the main brush 35 and may be configured to sweep dust from an area where the main brush may not able to sweep.

Figure 2:
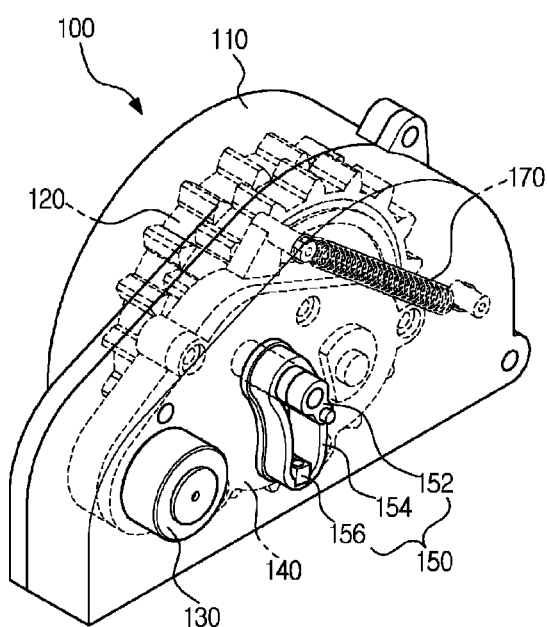
FIG. 2 is a perspective view of a driving wheel assembly in accordance with one embodiment of the present disclosure extracted from FIG. 1.

Referring to FIG. 2, the power unit 40 may include an driving motor 130 which may be configured to rotate an driving wheel 120, a main brush motor (not shown) which may be configured to rotate the main brush 35, and a battery 42 which may be configured to supply an driving power, while electrically connected with each driving unit, to drive the body 10.

The battery 42 may be arranged as a rechargeable secondary battery, and may be recharged by being supplied with a power from a docking station (not shown) when a cleaning task is completed and the body 10 is coupled to the docking station (not shown).

The driving wheel assemblies 100A and 100B may be respectively arranged at both sides of the central portion of the body 10, and may make a movement such as forward, backward, rotation, etc. while the body 10 is conducting the cleaning task.

Hereafter, the driving wheel assembly 100A, which may be positioned on the right side on the basis of the forward direction of the body 10, will be used as an example for explanation, and the descriptions to be explained hereafter will be equally applied to the driving wheel assembly 100B which may be positioned on the left side on the basis of the forward direction of the body 10 unless mentioned otherwise.

Figure 3:
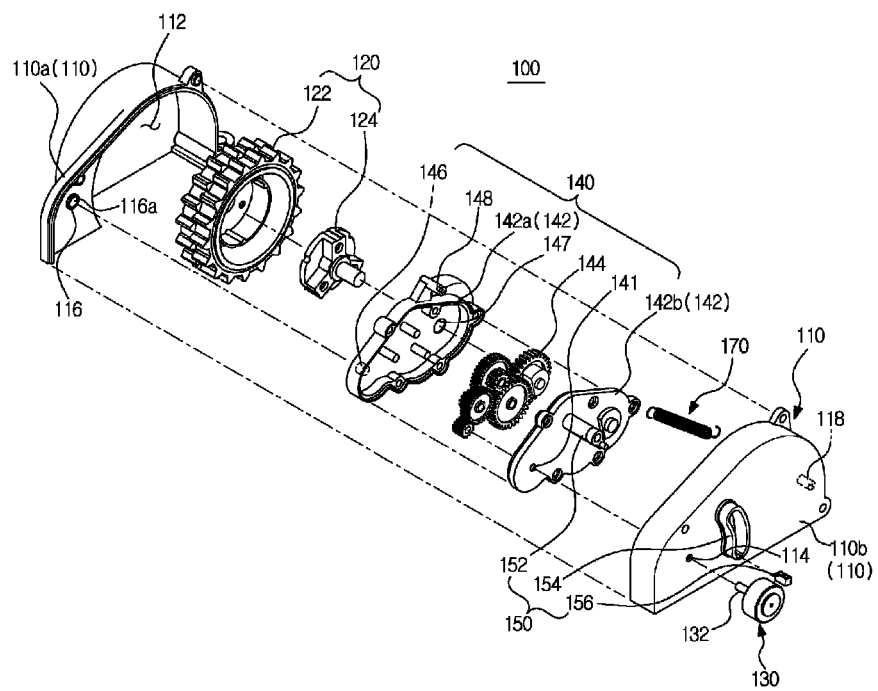
FIG. 3 is an exploded perspective view of the driving wheel assembly illustrated on FIG. 2.
Figure 4:
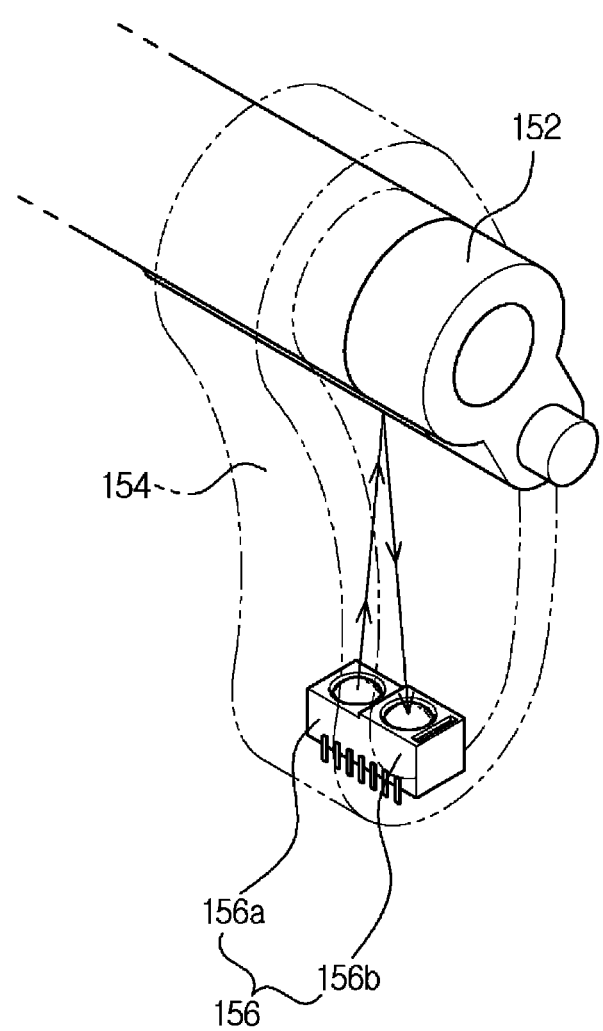
FIG. 4 is a view illustrating a sensor and a sensor target extracted from the driving wheel assembly illustrated on FIG. 2.

FIG. 2 is a perspective view of an driving wheel assembly in accordance with one embodiment of the present disclosure extracted from FIG. 1, and FIG. 3 is an exploded perspective view of the driving wheel assembly illustrated in FIG. 2, while FIG. 4 is a view illustrating a sensor and a sensor target extracted from the driving wheel assembly illustrated in FIG. 2.

As illustrated in FIGS. 2 to 4, the driving wheel assembly 100A may include may include a housing 110, the driving wheel 120 which is configured to drive the body 10, the driving motor 130 which is configured to rotate the driving wheel 120 by being coupled to one side of the housing 110, a gear assembly 140 which is arranged between the driving wheel 120 and the driving motor 130 and is configured to deliver the driving power of the driving motor 130 to the driving wheel 120, and a detection unit 140 which is configured to detect the displacement of the driving wheel 120.

The housing 110 may include the driving wheel 120, an accommodation unit 112 which may be configured to accommodate the gear assembly 140, a first coupling hole 114 which may be coupled to the driving motor 130, a first coupling bump 116 which may be coupled to the gear assembly 140, and a first support bump 118 which may be coupled to an elasticity member 170.

The accommodation unit 112 may be configured to have an open lower portion for the gear assembly 140 coupled to the housing 110 and for the driving wheel 120 coupled to the gear assembly 140 to move toward an upper direction and toward a lower direction according to the type and the condition of the floor surface of the cleaning area. The housing 100 may be comprised of a first housing part 110A and a second housing part 110B.

The first coupling hole 114 may be formed on the second housing part 110B of the housing 110, and may be configured to allow a axle 132 of the driving motor 130 to be coupled to the gear assembly 140 at the inside the housing 110.

The first coupling bump 116 may protrude from the inner surface of the first housing part 110A of the housing 110 where the driving motor 130 may be coupled to the inner side of the housing 110. At the center of the first coupling bump 116, in order for the gear assembly 140 to pivot while having the first coupling bump 116 as a center, an accommodation hole 116A may be arranged to pivotably accommodate a second coupling bump 146 of the gear assembly 140. In addition, the first coupling bump 116 may be arranged on the same axis of rotation with the first coupling hole 114 and with the axle 132 of the driving motor 130 which penetrates the first coupling hole 114.

The first support bump 118 may protrude toward the inner side of the housing 110 from the inner surface of the second housing part 110B of the housing 110 where the driving motor 130 may be coupled, and may be coupled to a first end of the elasticity member 170.

The driving wheel 120 may include a wheel unit 122 which may be configured to make direct contact with the floor surface of the cleaning area to be capable of driving the body 10 and a drive shaft 124 which may be configured to couple to the gear assembly 140 while fixed to the wheel unit 122 to drive and rotate the wheel unit 122.

The driving motor 130 may be coupled to the outer side of the second housing part 110B of the housing 110 at which the first coupling hole 114 is formed, and the axle 132 of the driving motor 130 may be coupled to the gear assembly 140 at the inside the housing 110 after penetrating through the first coupling hole 114. The driving power of the driving motor 130 may be delivered to the drive shaft 124 through the axle 132 and to a driving power delivering gears 144 which are connected to the axle 132 to rotate the driving wheel 120.

The gear assembly 140 may include a gear case 142, the driving power delivering gears 144 which may be interlocked to each other at the inside the gear case 142 and may be rotatably arranged, a second coupling bump 146 which may be configured to couple the gear assembly 140 to the housing 110, and a second support bump 148 which may be coupled to a second end of the elasticity member 170. The gear case 142 may be comprised of a first gear case part 142A and a second gear case part 142B.

The gear case 142 may be configured to rotatably support the power delivering gears 144 inside the gear case 142.

The driving power delivering gears 144 may be rotatably supported at the gear case 142 while interlocked to each other, and may be configured to deliver the driving power of the driving motor 130 to the drive shaft 124 by connecting the axle 132 of the driving motor to the drive shaft 124. The axle 132, by penetrating through a second coupling hole 141 which may be formed at the second gear case part 142B of the gear case 142, may be connected to one of the driving power delivering gears 144, and the drive shaft 124, by penetrating through a third coupling hole 147 of the first gear case part 142A of the gear case 142, may be connected to one of the remaining driving power delivering gears 144 which may not be coupled to the axle 132.

The second coupling bump 146 may be protruded from the first gear case part 142A of the gear case 142 facing toward a direction of the first coupling bump 116, and may be rotatably coupled at the accommodation hole 116A which may be formed at the first coupling bump 116.

The second support bump 148 may be protruded from the upper portion of the gear case 142 facing toward a direction of the first support bump 118, and may be coupled to the second end the elasticity member 170 which may be configured to elastically support the gear assembly 140.

The gear assembly 140, through the second coupling bump 146, may be pivotably coupled to the housing 110, and may be elastically supported at the housing 110 through the second support bump 148 and the elasticity member 170.

The detection unit 150 which may be configured to detect the displacement of the driving wheel 120 may include a sensor target 152 which may be arranged at the gear assembly 140, a guide slot 154 which may be configured to accommodate the sensor target 152, and a sensor 156 which may be installed at the guide slot 154 and may be configured to detect the sensor target 152.

The sensor target 152 may be protruded from the second gear case part 142B of the gear case 142 facing toward a direction of the second housing part 110B of the housing 110, and may be movably accommodated at the guide slot 154.

The guide slot 154 may be arranged at the second housing part 110B of the housing 110 and may be configured to accommodate the sensor target 152, and may form a guiding course which may be configured to guide the movement of the sensor target 152.

The sensor 156 may be installed at the lower portion of the guide slot 154, and may include a light emitting unit 156A which may be configured to generate and emit light at the sensor target 152 and a light receiving unit 156B which may be configured to receive the light reflected by the sensor target 152.

The sensor 156 may detect the gap distance from the sensor target 152 through the pattern change of the light received according to the gap distance from the sensor target 152 moving by following the guide slot 154, and may detect the displacement of the driving wheel 120 by converting the gap distance into a standardized parameter such as a voltage.

Figure 5A:
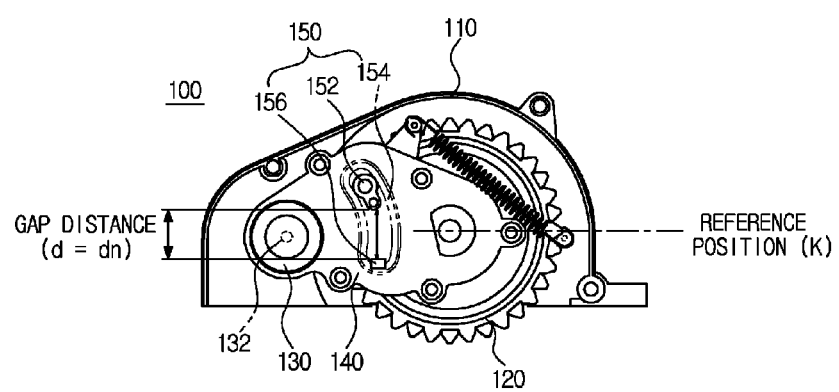
FIGS. 5A to 5C are views illustrating a change of a gap distance between the sensor and the sensor target according to a displacement of a driving wheel.
Figure 5B:
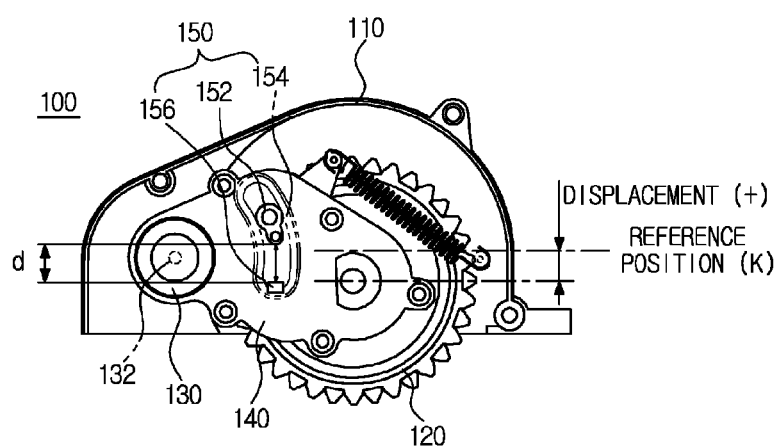
Figure 5C:
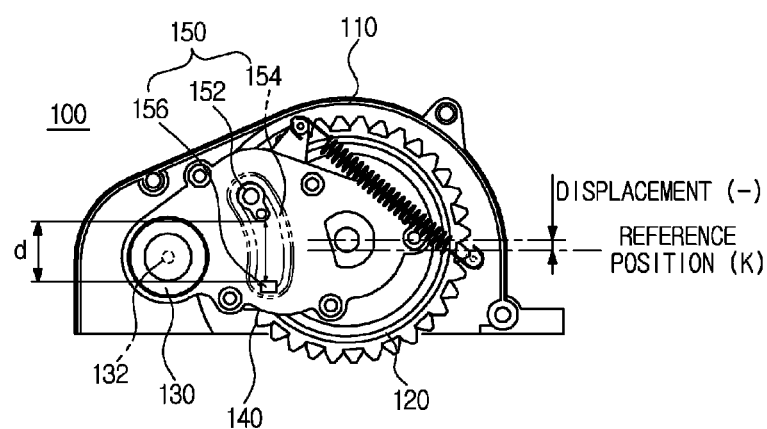
Figure 6:
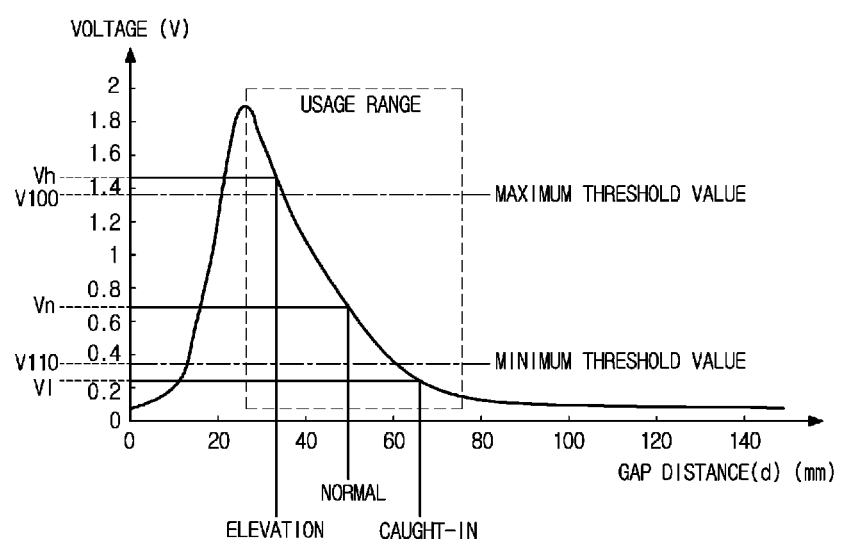
FIG. 6 is a graph illustrating a relation between the gap distance of the sensor and the sensor target and the voltage generated at the sensor.
Figure 7:
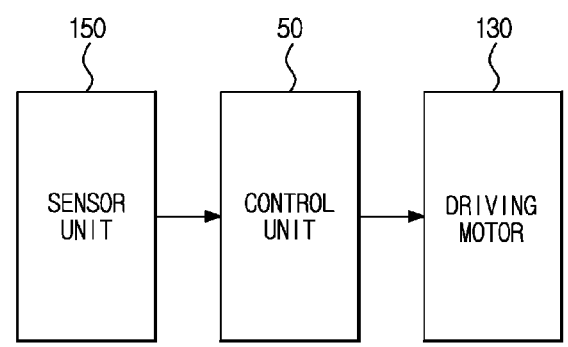
FIG. 7 is an interlock-block diagram of the sensor and a driving motor.

FIGS. 5A to 5C are views illustrating a change of a gap distance between the sensor and the sensor target according to a displacement of a driving wheel and FIG. 6 is a graph illustrating a relation between the gap distance of the sensor and the sensor target and the voltage generated at the sensor, while FIG. 7 is an interlock-block diagram of the sensor and a driving motor.

First, the position where the central rotation of the driving wheel 120 is placed when the body 10 of the autonomous cleaner 1 conducts a cleaning by driving on a hard floor (hereafter called H/F) such as a wooden floor may be defined as a reference position K, and the gap distance d between the sensor 156 and the sensor target 152 at this time may be defined as a reference gap distance dn. In addition, when the central position of the driving wheel 120 is positioned at a lower position than K, the driving wheel 120 may be defined to have a positive (+) displacement; and when the central position of the driving wheel 120 is positioned at a higher position than K, the driving wheel 120 may be defined to have a negative (−) displacement.

As illustrated in FIG. 5A, when the body 10 drives on the H/F area without a particular obstacle, the gap distance d between the sensor 156 and the sensor target 152 may be the reference gap distance dn, and the displacement of the driving wheel 120 according to dn may be 0.

As illustrated in FIG. 5B, when the body 10 encounters and drives over an inclined plane or a drive-over obstacle B1 (refer to FIGS. 28A to 28D), the gear assembly 140 may pivot in a clockwise direction while having the axle 132 of the driving motor 130 and the second coupling bump 146, which may be arranged on the same axis of rotation, as the center, and the sensor target 152 which may move along the gear assembly 140 also may pivot in a clockwise direction. That is, the gap distance d between the sensor 156 and the sensor target 152 may become smaller than the reference gap distance dn.

As illustrated in FIG. 5C, when the body 10 encounters a caught-in obstacle B2 such as a table (refer to FIGS. 30A to 30D), the gear assembly 140 may pivot in a counter-clockwise direction while having the axle 132 of the driving motor 130 and the second coupling bump 146, which may be arranged on the same axis or rotation, as the center, and the sensor target 152 which may move along the gear assembly 140 also may pivot in a counter-clockwise direction. That is, the gap distance d between the sensor 156 and the sensor target 152 may become larger than the reference gap distance dn.

FIG. 6 is a graph illustrating a reference which may be configured to detect the displacement of the driving wheel 120 by converting the gap distance d from the sensor target 152 which is detected by the sensor 156 into a standardized parameter such as a voltage. The horizontal axis of the graph shows a gap distance d between the sensor 156 and the sensor target 152 and the vertical axis of the graph shows a voltage corresponding to the reference gap distance dn between the sensor 156 and the sensor target 152.

As illustrated in FIG. 6, in a case when the gap distance d between the sensor 156 and the sensor target 152 is same as the reference gap distance dn, the sensor 156 may convert such into the reference voltage Vn which corresponds to the reference gap distance dn, and may detect the displacement of the driving wheel 120 at 0.

In a case when the gap distance d between the sensor 156 and the sensor target 152 becomes smaller than the reference gap distance dn (FIG. 5B), the sensor 156 may convert such into a voltage which may be lower than the reference voltage Vn that corresponds to the reference gap distance dn, and may detect that the displacement of the driving wheel 120 is considered to have a positive (+) value.

That is, within the usage range of the sensor 156, the gap distance d between the sensor 156 and the sensor target 152 may be in a reciprocal relation to a voltage, and the voltage may be considered to be in a proportional relation to the displacement of the driving wheel 120.

As such, the displacement of the driving wheel 120 detected by the sensor 156, as illustrated in FIG. 7, may be transmitted to a control unit 50, and the control unit 50 may compare the displacement of the driving wheel 120 to the prescribed reference range.

The control unit 50, if it is determined that the displacement of the driving wheel 120 is within the prescribed reference range, may control the driving motor 130 to maintain a driving course of the body 10; and if it is determined that the displacement of the driving wheel 120 is out of the prescribed reference range, may control the driving motor 130 to change the driving course of the body 10.

For example, when the body 10 encounters and drives over an inclined plane or a drive-over obstacle B1 and when the driving wheel 120 is excessively elevated and the voltage that corresponds to the displacement of the driving wheel 120 exceeds the maximum threshold value V100 of the prescribed reference range, or when the body 10 encounters and drives through a caught-in obstacle B2 and when the body 10 is caught in at the caught-in obstacle and the voltage that corresponds to the displacement of the driving wheel 120, which is detected by the sensor 156, does not reach at the minimum threshold value V110 of the prescribed reference range, the control unit 50 may change the driving course of the body 10 by controlling the rotation frequency of the driving motor 130 or the rotation direction.

The maximum threshold value V100 and the minimum threshold value V110 of the reference range may be prescribed by considering the voltage detected by the sensor 156 in the state when in fact the driving wheel 120 is elevated and therefore the body 10 is no longer drivable (hereafter called "elevation") or in the state when the body 10 is caught in and therefore the body 10 is no longer drivable (hereafter called "caught-in"). That is, the maximum threshold value V100 may be established at a modestly lower value than the voltage Vh detected by the sensor 156 in a state of body 10 elevation, and the minimum threshold value V110 may be established at a modestly higher value than the voltage Vl detected by the sensor 156 in a state of the body 10 being caught in.

Meanwhile, a detection unit and a detection method configured to detect the displacement of the driving wheel 120 may be realized through various methods which are different from the detection unit 150 and the detection method of the driving wheel assembly 100A and 100B in accordance with the one embodiment of the present disclosure which are previously explained.

Hereafter, a variety of modified embodiments 250, 350, 450, 550, and 650 of the detection unit are explained. For convenience, the explanations with reference to the compositions that overlap with those of the driving wheel assembly 100A and 100B in accordance with one embodiment of the present disclosure which are previously explained will be omitted, and the variety of modified embodiments 250, 350, 450, 550, and 650 of the detection unit is independent to each other and is independent to one another with reference to the detection unit 150 of driving wheel assembly 100A and 100B in accordance with one embodiment of the present disclosure.

Figure 8A:
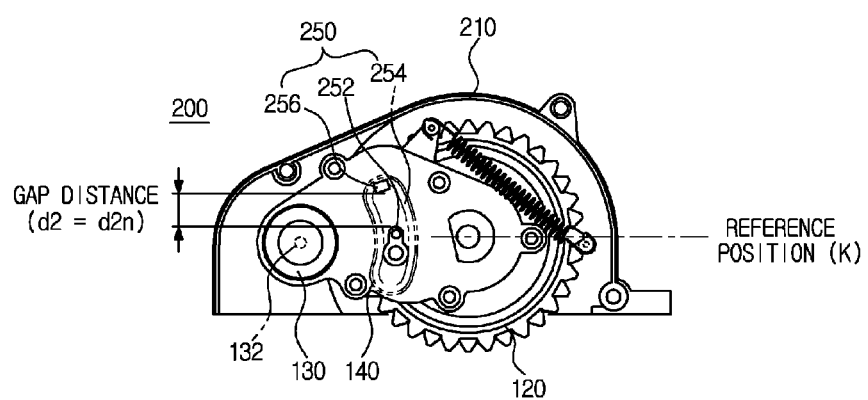
FIGS. 8A to 8C are views illustrating the driving wheel assembly in accordance with a second embodiment of the present disclosure, further illustrating the change of the gap distance between the sensor and the sensor target according to the displacement of the driving wheel.
Figure 8B:
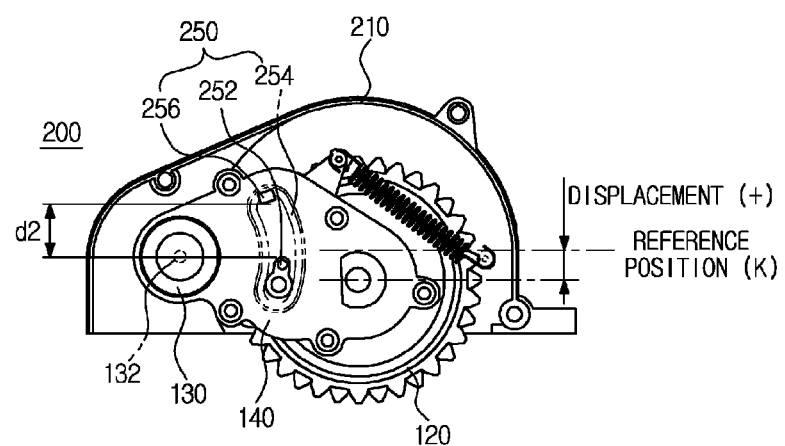
Figure 8C:
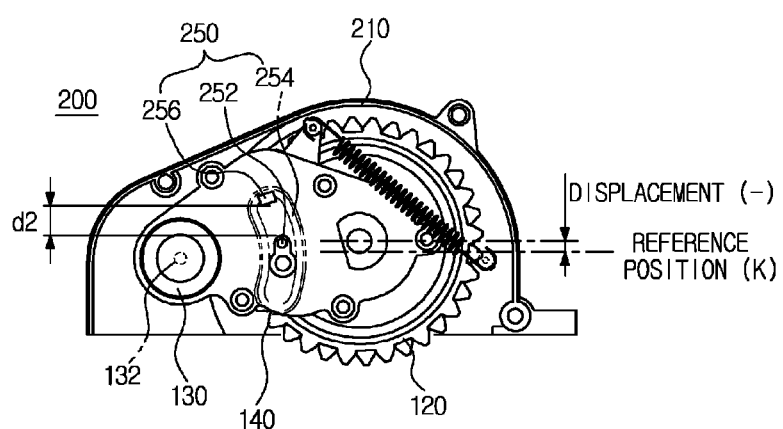
Figure 9:
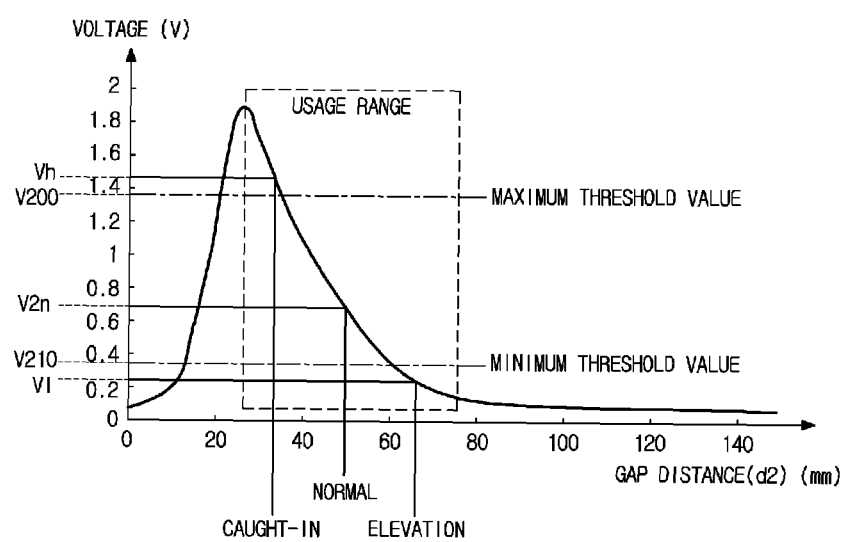
FIG. 9 is a graph, in accordance with the second embodiment of the present disclosure, illustrating the relation between the gap distance of the sensor and the sensor target and the voltage generated at the sensor.

FIGS. 8A to 8C are views illustrating the driving wheel assembly in accordance with a second embodiment of the present disclosure, further illustrating the change of the gap distance between the sensor and the sensor target according to the displacement of the driving wheel, and FIG. 9 is a graph, in accordance with the second embodiment of the present disclosure, illustrating the relation between the gap distance of the sensor and the sensor target and the voltage generated at the sensor.

As illustrated in FIGS. 8A to 8C, a detection unit 250 which may be arranged at the driving wheel assembly 200 in accordance with the second embodiment of the present disclosure and may be configured to detect the displacement of the driving wheel 120 may include a sensor target 252 arranged at the gear assembly 140, a guide slot 254 accommodating the sensor target 252, and a sensor 256 installed at the guide slot 254 and configured to detect the sensor target 252.

The sensor target 252 may be movably accommodated to the guide slot 254 at the lower portion of the sensor 256.

The guide slot 254 may be arranged at one side surface of a housing 210 and may accommodate the sensor target 252, and may form a driving course which guides the movement of the sensor target 252.

The sensor 256 may be installed at the upper portion of the guide slot 254 and may be configured to detect the gap distance from the sensor target 252 through the pattern change of the light received according to the gap distance from the sensor target 252 which moves by following the guide slot 254, and may detect the displacement of the driving wheel 120 by converting the gap distance from the sensor target 252 sensed into a standardized parameter such as a voltage.

As illustrated in FIG. 8B, if the body 10 encounters and drives over the inclined plane or the drive-over obstacle B1 (refer to FIGS. 28A to 28D), the gear assembly 140 may pivot in a clockwise direction while having the axle 132 of the driving motor 130 as a center of rotation, and the sensor target 252 which may move along the gear assembly 140 also may pivot in a clockwise direction. That is, the gap distance d2 between the sensor 256 and the sensor target 252 may become larger than the reference gap distance d2$n$.

As illustrated in FIG. 8C, when the body 10 encounters a caught-in obstacle B2 such as a table (refer to FIGS. 30A to 30D), the gear assembly 140 may pivot in a counter-clockwise direction while having the axle 132 of the driving motor 130 as a center of rotation, and the sensor target 152 which may move along the gear assembly 140 also may pivot in a counter-clockwise direction. That is, the gap distance d2 between the sensor 256 and the sensor target 252 may become smaller than the reference gap distance d2$n$.

FIG. 9 is a graph illustrating a reference which may be configured to detect the displacement of the driving wheel 120 by converting the gap distance d2 from the sensor target 252 which may be detected by the sensor 256 into a standardized parameter such as a voltage. The horizontal axis of the graph shows a gap distance d2 between the sensor 256 and the sensor target 252 and the vertical axis of the graph shows a voltage corresponding to the reference gap distance d2$n$ between the sensor 256 and the sensor target 252.

As illustrated in FIG. 9, when the gap distance d2 between the sensor 256 and the sensor target 252 is same as the reference gap distance d2$n$, the sensor 256 may convert such into the reference voltage V2$n$ which may correspond to the reference gap distance d2$n$, and may detect the displacement of the driving wheel 120 at 0.

When the gap distance d2 between the sensor 256 and the sensor target 252 becomes larger than the reference gap distance d2$n$, the sensor 256 may convert such into a voltage which is lower than the reference voltage V2$n$ that corresponds to the reference gap distance d2$n$, and may detect that the displacement of the driving wheel 120 is considered to have a positive (+) value. If the voltage that corresponds to the displacement of the driving wheel 120, which is detected by the sensor 256, does not reach at the minimum threshold value V210 of the prescribed reference range, the control unit 50 may determine that the body 10 is in a state of elevation and may change the driving course of the body 10 by controlling the rotation frequency of the driving motor 130 or the rotation direction.

When the gap distance d2 between the sensor 256 and the sensor target 252 becomes smaller than the reference gap distance d2$n$, the sensor 256 may convert such into a voltage which is higher than the reference voltage V2$n$ that corresponds to the reference gap distance d2$n$, and may detect that the displacement of the driving wheel 120 is considered to have a negative (−) value. If the voltage that corresponds to the displacement of the driving wheel 120, which is detected by the sensor 256, exceeds at the maximum threshold value V200 of the prescribed reference range, the control unit 50 may determine that the body 10 is in a state of caught-in and may change the driving course of the body 10 by controlling the rotation frequency of the driving motor 130 or the rotation direction.

That is, within the usage range of the sensor 256, the gap distance d between the sensor 256 and the sensor target 252 may be in a reciprocal relation to a voltage, and the voltage may be considered to be in a proportional relation to the displacement of the driving wheel 120.

Figure 10A:
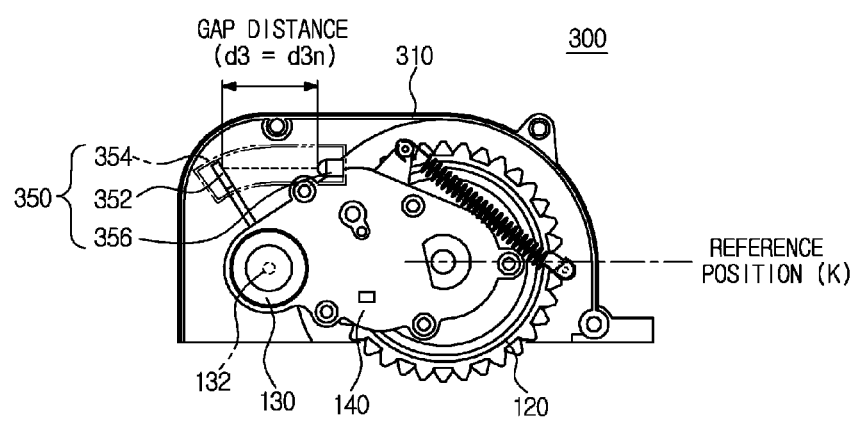
FIGS. 10A to 10C are views illustrating the driving wheel assembly in accordance with a third embodiment, further illustrating the change of the gap distance between the sensor and the sensor target according to the displacement of the driving wheel.
Figure 10B:
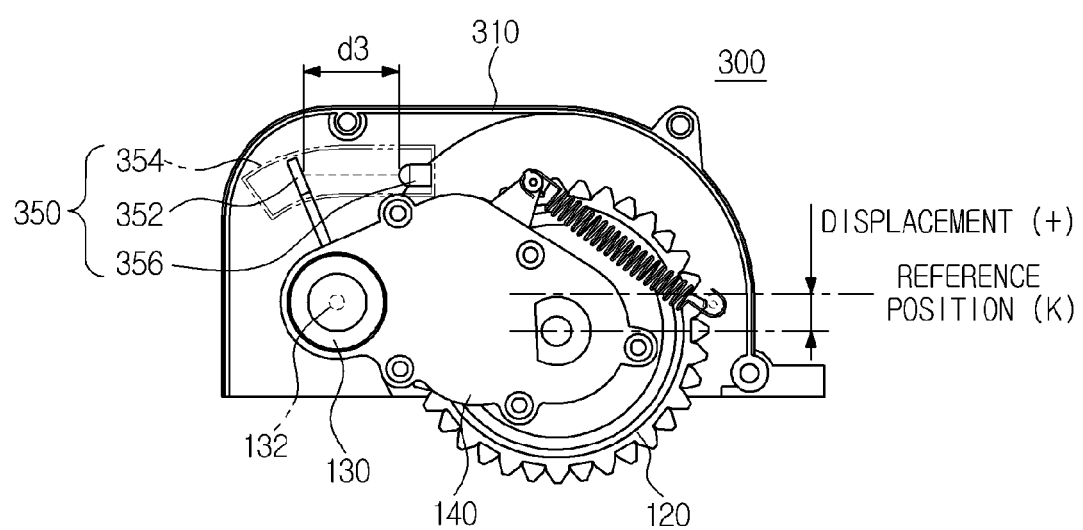
Figure 10C:
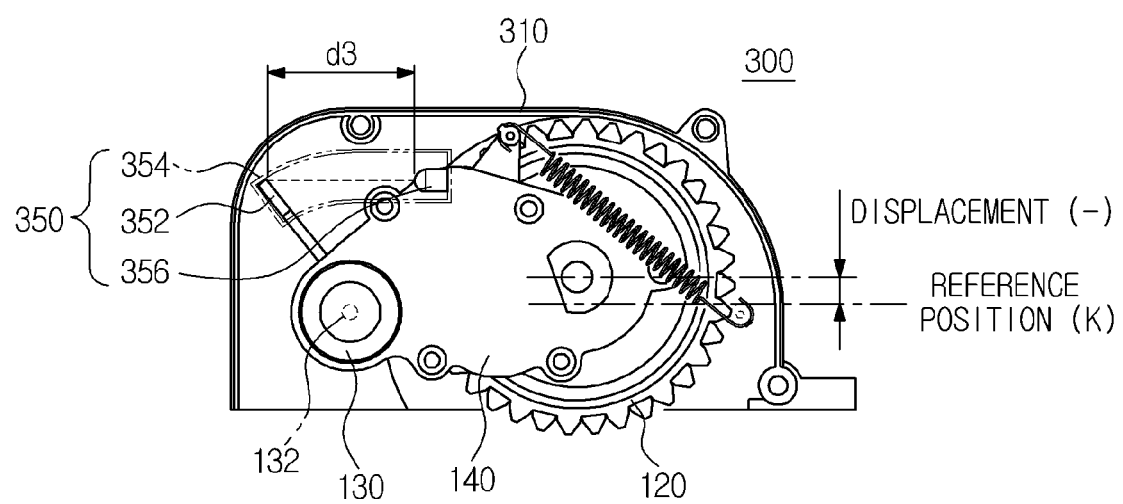
Figure 11:
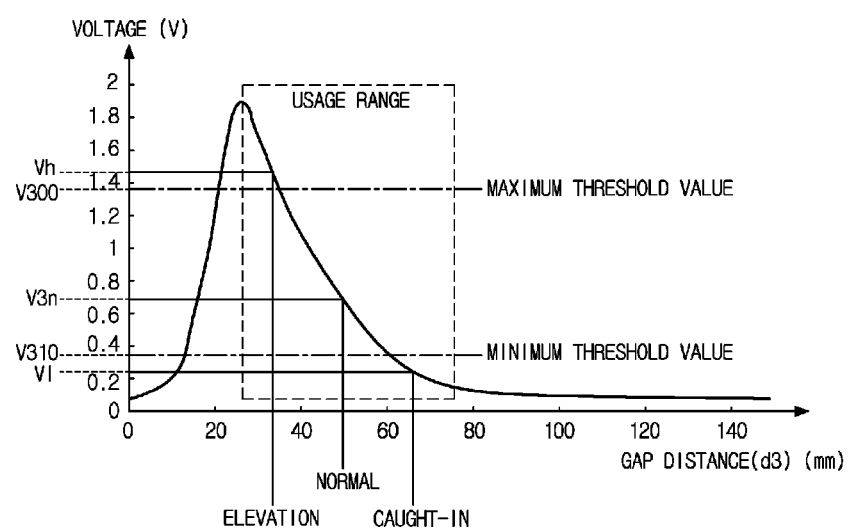
FIG. 11 is a graph, in accordance with a third embodiment of the present disclosure, illustrating the relation between the gap distance of the sensor and the sensor target and the voltage generated at the sensor.

FIGS. 10A to 10C are views illustrating the driving wheel assembly in accordance with a third embodiment, further illustrating the change of the gap distance between the sensor and the sensor target according to the displacement of the driving wheel, and FIG. 11 is a graph, in accordance with a third embodiment of the present disclosure, illustrating the relation between the gap distance of the sensor and the sensor target and the voltage generated at the sensor.

As illustrated in FIGS. 10A to 10C, a detection unit 350, which may be arranged at the driving wheel assembly 300 in accordance with the third embodiment of the present disclosure and may be configured to detect the displacement of the driving wheel 120, may include a sensor target 352 arranged at the gear assembly 140, a guide slot 354 accommodating the sensor target 352, and a sensor 356 installed at the guide slot 354 and configured to detect the sensor target 352.

The sensor target 352 may be arranged in a form of a bar which may be extended from the upper portion of the gear assembly 140 toward an upward direction in approximation.

The guide slot 354 may be arranged at one side surface of a housing 310 and may accommodate the sensor target 352, and may form a driving course which may guide the movement of the sensor target 352.

The sensor 356 may be installed at the upper portion of the guide slot 354 and may be configured to detect the gap distance from the sensor target 352 through the pattern change of the light received according to the gap distance from the sensor target 352 which may move by following the guide slot 354, and may detect the displacement of the driving wheel 120 by converting the gap distance from the sensor target 352 sensed into a standardized parameter such as a voltage.

As illustrated in FIG. 10A, when the body 10 drives on the H/F area without a particular obstacle, the gap distance d3 between the sensor 356 and the sensor target 352 may become the reference gap distance d3$n$, and the displacement of the driving wheel 120 according to d3$n$ may become 0.

As illustrated in FIG. 10B, when the body 10 encounters and drives over an inclined plane or a drive-over obstacle B1 (refer to FIGS. 28A to 28D), the gear assembly 140 may pivot in a clockwise direction while having the axle 132 of the driving motor 130 or the second coupling bump 146, which is arranged on the same axis of rotation, as a center of rotation, and the sensor target 352 which may move along the gear assembly 140 also may pivot in a clockwise direction. That is, the gap distance d3 between the sensor 356 and the sensor target 352 may become smaller than the reference gap distance d3$n$.

As illustrated in FIG. 10C, when the body 10 encounters a caught-in obstacle B2 such as a table (refer to FIGS. 30A to 30D), the gear assembly 140 may pivot in a counter-clockwise direction while having the axle 132 of the driving motor 130 as a center of rotation, and the sensor target 352 which may move along the gear assembly 140 also may pivot in a counter-clockwise direction. That is, the gap distance d3 between the sensor 356 and the sensor target 352 may become larger than the reference gap distance d3$n$.

FIG. 11 is a graph illustrating a reference which may be configured to detect the displacement of the driving wheel 120 by converting the gap distance from the sensor target 352 which is detected by the sensor 356 into a standardized parameter such as a voltage. The horizontal axis of the graph shows a gap distance d3 between the sensor 356 and the sensor target 352 and the vertical axis of the graph shows a voltage corresponding to the reference gap distance d3$n$ between the sensor 356 and the sensor target 352.

As illustrated in FIG. 11, when the gap distance d3 between the sensor 356 and the sensor target 352 is smaller than the reference gap distance d3$n$, the sensor 356 may convert such into the reference voltage V3$n$ which may correspond to the reference gap distance d3$n$, and may detect the displacement of the driving wheel 120 at 0.

When the gap distance d3 between the sensor 356 and the sensor target 352 becomes smaller than the reference gap distance d3$n$, the sensor 356 may convert such into a voltage which is higher than the reference voltage V3$n$ that corresponds to the reference gap distance d3$n$, and may detect that the displacement of the driving wheel 120 is considered to have a positive (+) value. If the voltage that corresponds to the displacement of the driving wheel 120, which is detected by the sensor 356, exceeds the maximum threshold value V300 of the prescribed reference range, the control unit 50 may determine that the body 10 is in a state of elevation and may change the driving course of the body 10 by controlling the rotation frequency of the driving motor 130 or the rotation direction.

When the gap distance d3 between the sensor 356 and the sensor target 352 becomes larger than the reference gap distance d3$n$, the sensor 356 may convert such into a voltage which is lower than the reference voltage V3$n$ that corresponds to the reference gap distance d3$n$, and may detect that the displacement of the driving wheel 120 is considered to have a negative (−) value. If the voltage that corresponds to the displacement of the driving wheel 120, which is detected by the sensor 356, does not reach at the minimum threshold value V310 of the prescribed reference range, the control unit 50 may determine that the body 10 is in a state of caught-in and may change the driving course of the body 10 by controlling the rotation frequency of the driving motor 130 or the rotation direction.

That is, within the usage range of the sensor 356, the gap distance d between the sensor 356 and the sensor target 352 may be in a reciprocal relation to a voltage, and the voltage may be considered to be in a proportional relation to the displacement of the driving wheel 120.

Figure 12A:
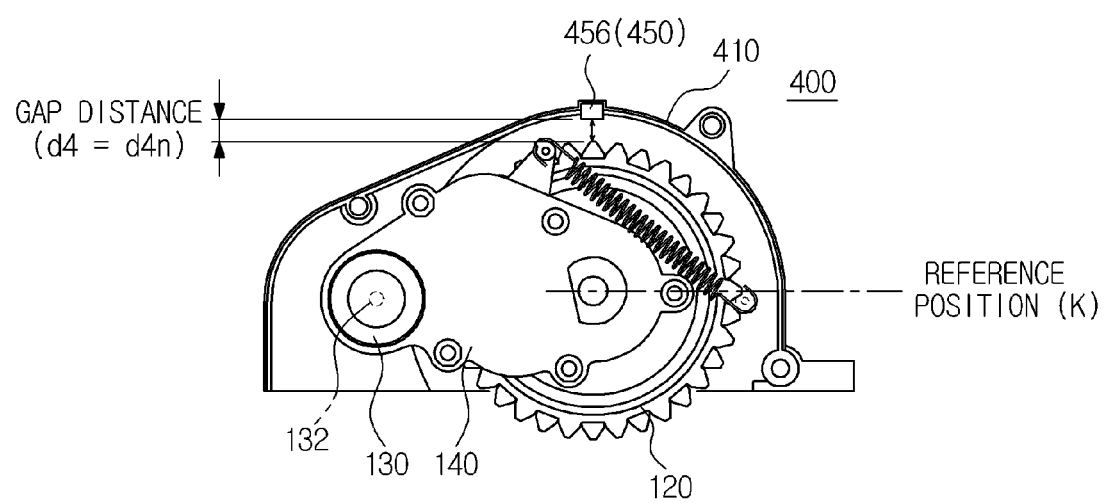
FIGS. 12A to 12C are views illustrating the driving wheel assembly in accordance with a fourth embodiment, further illustrating the change of the gap distance between the sensor and the sensor target according to the displacement of the driving wheel.
Figure 12B:
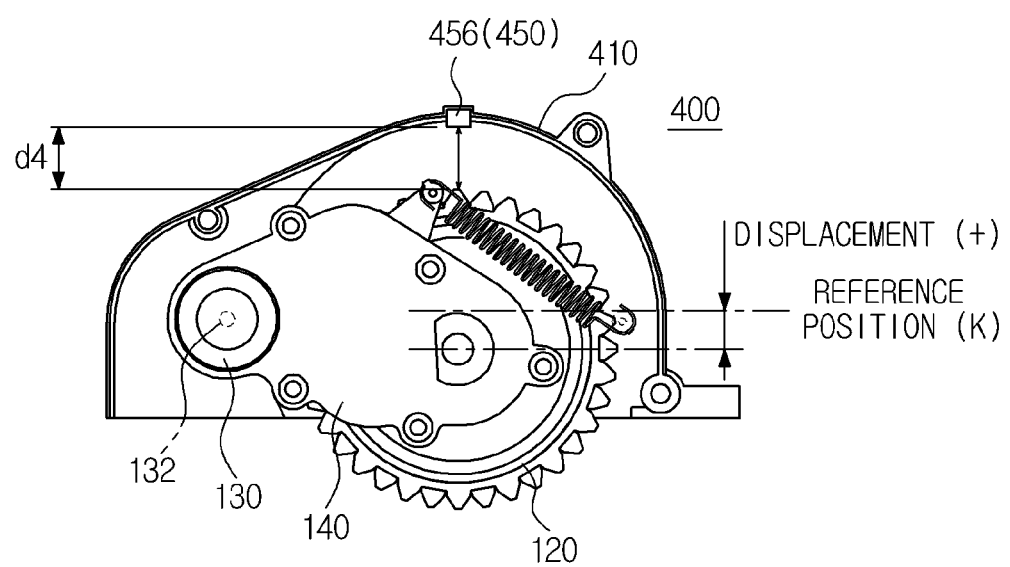
Figure 12C:
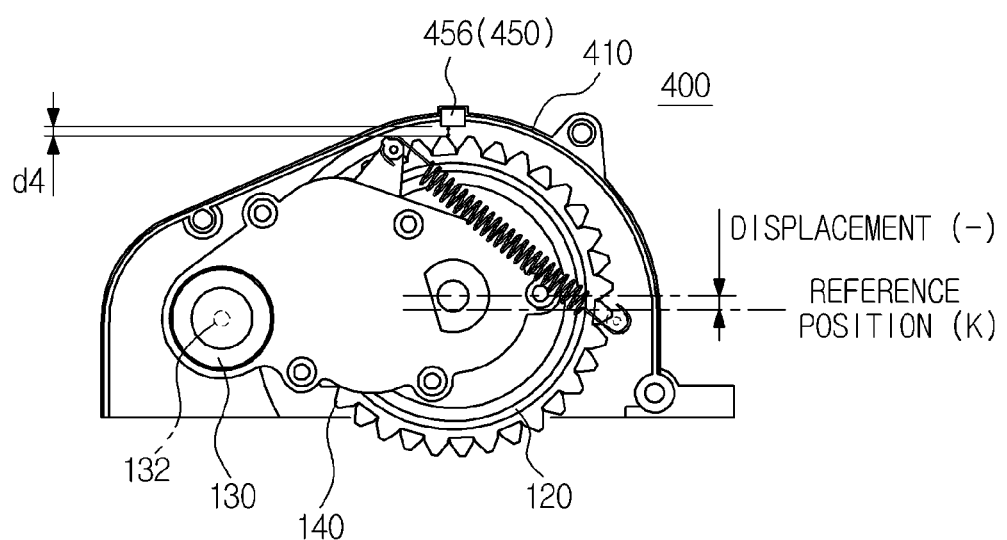
Figure 13:
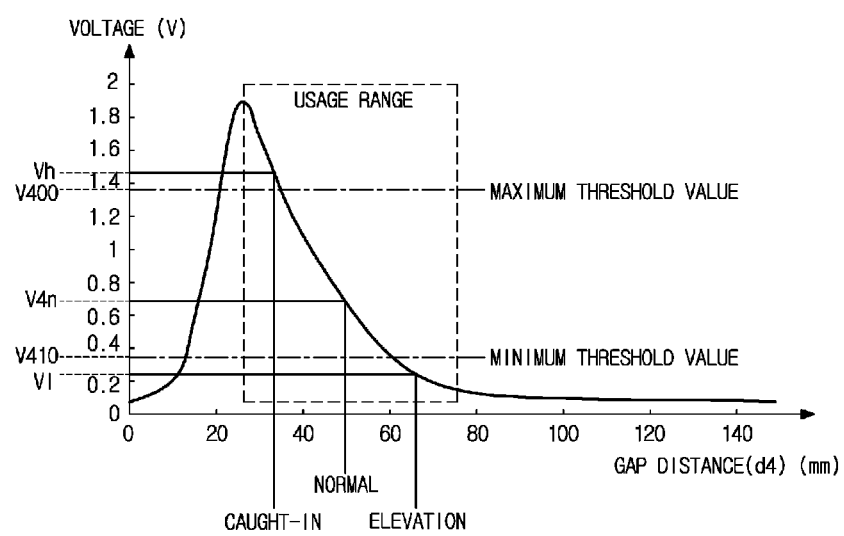
FIG. 13 is a graph, in accordance with the fourth embodiment of the present disclosure, illustrating the relation between the gap distance of the sensor and the sensor target and the voltage generated at the sensor.

FIGS. 12A to 12C are views illustrating the driving wheel assembly in accordance with a fourth embodiment, further illustrating the change of the gap distance between the sensor and the sensor target according to the displacement of the driving wheel, and FIG. 13 is a graph, at the driving wheel assembly in accordance with the fourth embodiment of the present disclosure, illustrating the relation between the gap distance of the sensor and the sensor target and the voltage generated at the sensor.

As illustrated in FIGS. 12A to 12C, a detection unit 450, which may be arranged at the driving wheel assembly 400 in accordance with the fourth embodiment of the present disclosure and may be configured to detect the displacement of the driving wheel 120, may include a sensor 456.

The sensor 456 may be installed at the inner side or at the outer side of the housing 410 which may be positioned at the upper portion of the driving wheel 120 and may be configured to detect the gap distance from the driving wheel 120 through the pattern change of the light received according to the gap distance from the driving wheel 120 which moves along with the gear assembly 140, and may detect the displacement of the driving wheel 120 by converting the gap distance from the driving wheel 120 sensed into a standardized parameter such as a voltage.

As illustrated in FIG. 12A, when the body 10 drives on the H/F area without a particular obstacle, the gap distance d4 between the sensor 456 and the driving wheel 120 may be the reference gap distance d4$n$, and the displacement of the driving wheel 120 according to d3$n$ may be 0.

As illustrated in FIG. 12B, when the body 10 encounters and drives over an inclined plane or a drive-over obstacle B1 (refer to FIGS. 28A to 28D), the gear assembly 140 may pivot in a clockwise direction while having the axle 132 of the driving motor 130 as a center of rotation, and the driving wheel 120 which may move along the gear assembly 140 also may pivot in a clockwise direction. That is, the gap distance d4 between the sensor 456 and the driving wheel 120 may become larger than the reference gap distance d4$n$.

As illustrated in FIG. 12C, when the body 10 encounters a caught-in obstacle B2 such as a table (refer to FIGS. 30A to 30D), the gear assembly 140 may pivot in a counter-clockwise direction while having the axle 132 of the driving motor 130 as a center of rotation, and the driving wheel 120 which may move along the gear assembly 140 also may pivot in a counter-clockwise direction. That is, the gap distance d4 between the sensor 456 and the driving wheel 120 may become smaller than the reference gap distance d4$n$.

FIG. 13 is a graph illustrating a reference which may be configured to detect the displacement of the driving wheel 120 by converting the gap distance d4 from the driving wheel 120 which may be detected by the sensor 456 into a standardized parameter such as a voltage. The horizontal axis of the graph shows a gap distance d4 between the sensor 456 and the driving wheel 120 and the vertical axis of the graph shows a voltage corresponding to the reference gap distance d4$n$ between the sensor 456 and the driving wheel 120.

As illustrated in FIG. 13, in a case when the gap distance d4 between the sensor 456 and the driving wheel 120 is same as the reference gap distance d4$n$, the sensor 456 may convert such into the reference voltage V4$n$ which may correspond to the reference gap distance d4$n$, and may detect the displacement of the driving wheel 120 at 0.

In a case when the gap distance d4 between the sensor 456 and the driving wheel 120 is same as the reference gap distance d4$n$, the sensor 456 may convert such into a voltage which is lower than the reference voltage V4$n$ that corresponds to the reference gap distance d4$n$, and may detect that the displacement of the driving wheel 120 is considered to have a positive (+) value. If the voltage that corresponds to the displacement of the driving wheel 120, which may be detected by the sensor 456, does not reach at the minimum threshold value V410 of the prescribed reference range, the control unit 50 may determine that the body 10 is in a state of elevation and may change the driving course of the body 10 by controlling the rotation frequency of the driving motor 130 or the rotation direction.

In a case when the gap distance d4 between the sensor 456 and the driving wheel 120 becomes smaller than the reference gap distance d4$n$, the sensor 456 may convert such into a voltage which is higher than the reference voltage V4$n$ that corresponds to the reference gap distance d4$n$, and may detect that the displacement of the driving wheel 120 is considered to have a negative (−) value. If the voltage that corresponds to the displacement of the driving wheel 120, which is detected by the sensor 456, exceeds the maximum threshold value V400 of the prescribed reference range, the control unit 50 may determine that the body 10 is in a state of caught-in and may change the driving course of the body 10 by controlling the rotation frequency of the driving motor 130 or the rotation direction.

That is, within the usage range of the sensor 456, the gap distance d between the sensor 456 and the driving wheel 120 may be in a reciprocal relation to a voltage, and the voltage may be considered to be in a proportional relation to the displacement of the driving wheel 120.

Figure 14A:
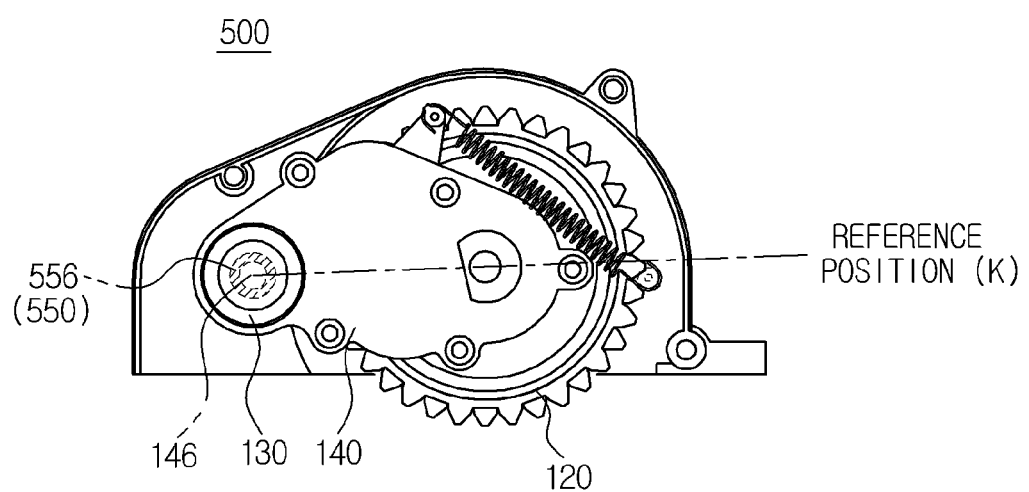
FIGS. 14A to 14C are views illustrating the driving wheel assembly in accordance with a fifth embodiment, further illustrating an pivotal angle change of the driving wheel according to the displacement of the driving wheel.
Figure 14B:
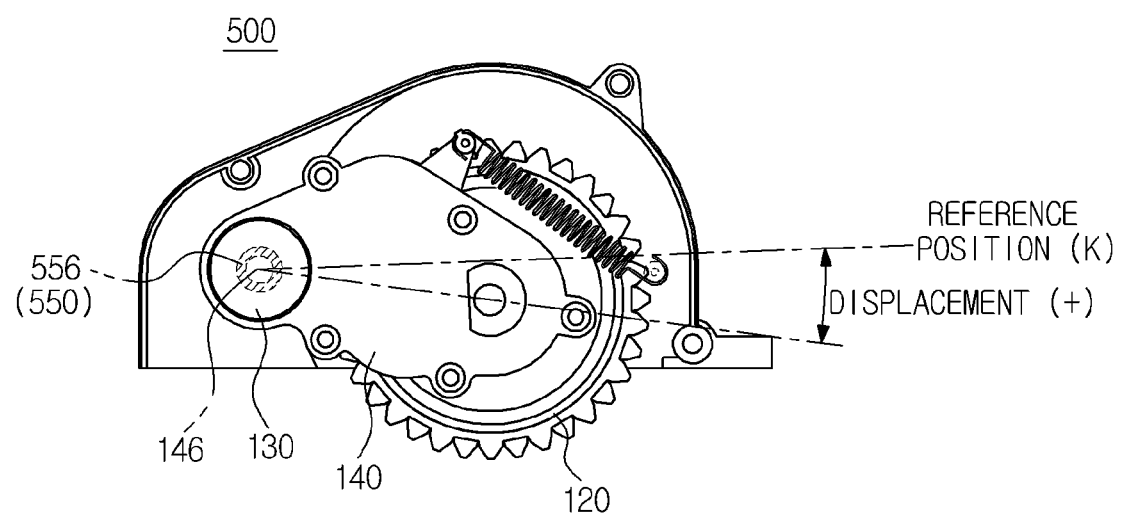
Figure 14C:
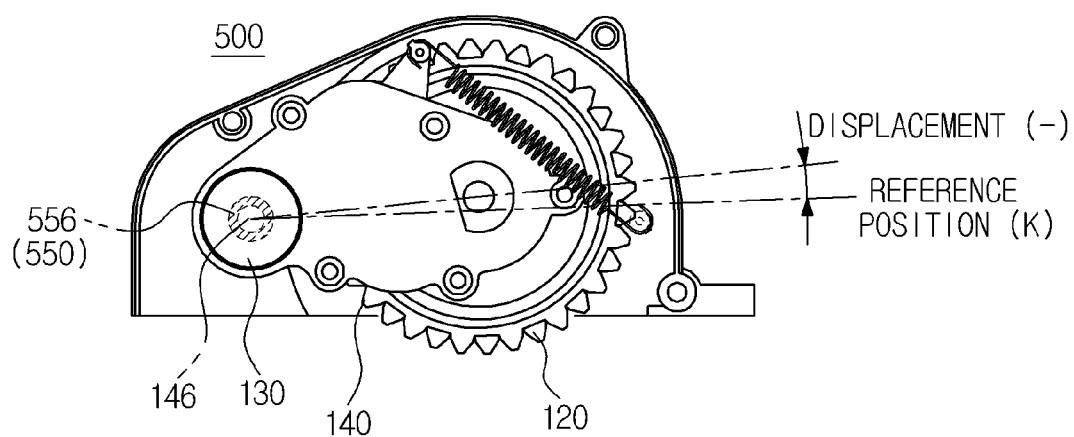

FIGS. 14A to 14C are views illustrating the driving wheel assembly in accordance with a fifth embodiment, further illustrating a pivotal angle change of the driving wheel according to the displacement of the driving wheel.

As illustrated in FIGS. 14A to 14C, a detection unit 550, which may be arranged at the driving wheel assembly 500 in accordance with the fifth embodiment of the present disclosure and may be configured to detect the displacement of the driving wheel 120, may include the gear assembly 140 or a sensor 556 which may be configured to directly detect the pivoting of the driving wheel 120.

The sensor 456 may be installed at the central rotation of the gear assembly 140 and may detect the gear assembly 140 or the pivotal angle of the driving wheel 120 which also may pivot along with the gear assembly 140.

As illustrated in FIG. 14A, when the body 10 drives on the H/F area without a particular obstacle, the gear assembly 140 or the pivotal angle of the driving wheel 120 detected by a sensor 556 may become 0, and therefore, the displacement of the driving wheel 120 also may become 0.

As illustrated in FIG. 14B, when the body 10 encounters and drives over an inclined plane or a drive-over obstacle B1 (refer to FIGS. 28A to 28D), the gear assembly 140 may pivot in a clockwise direction while having the axle 132 of the driving motor 130 as a center of rotation and the driving wheel 120 which may move along the gear assembly 140 also may pivot in a clockwise direction, and the sensor 556 may detect in such state that the displacement of the driving wheel 120 may be considered to have a positive (+) value.

If the displacement of the driving wheel 120 detected by the sensor 556 exceeds the maximum threshold value of the prescribed reference range, the control unit 50 may determine that the body 10 is in a state of elevation and may change the driving course of the body 10 by controlling the rotation frequency of the driving motor 130 or the rotation direction.

As illustrated in FIG. 14C, when the body 10 encounters a caught-in obstacle B2 such as a table (refer to FIGS. 30A to 30D), the gear assembly 140 may pivot in a counter-clockwise direction while having the axle 132 of the driving motor 130 as a center of rotation and the driving wheel 120 which may move along the gear assembly 140 also may pivot in a counter-clockwise direction, and the sensor 556 may detect in such state that the displacement of the driving wheel 120 may be considered to have a negative (−) value.

If the displacement of the driving wheel 120 detected by the sensor 556 does not reach at the minimum threshold value of the prescribed reference range, the control unit 50 may determine that the body 10 is in a state of caught-in and may change the driving course of the body 10 by controlling the rotation frequency of the driving motor 130 or the rotation direction.

Figure 15:
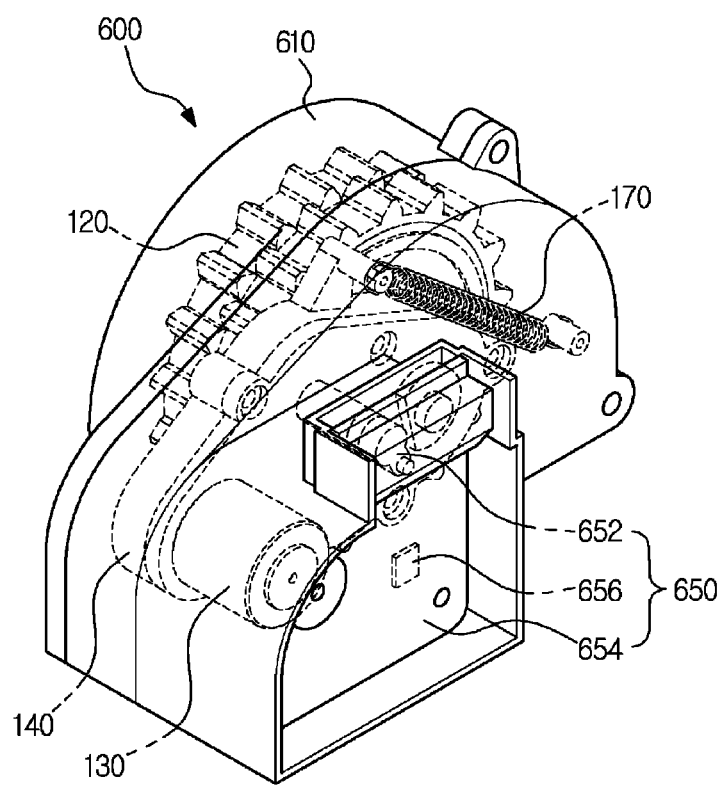
FIG. 15 is a perspective view illustrating the driving wheel assembly in accordance with a sixth embodiment
Figure 16:
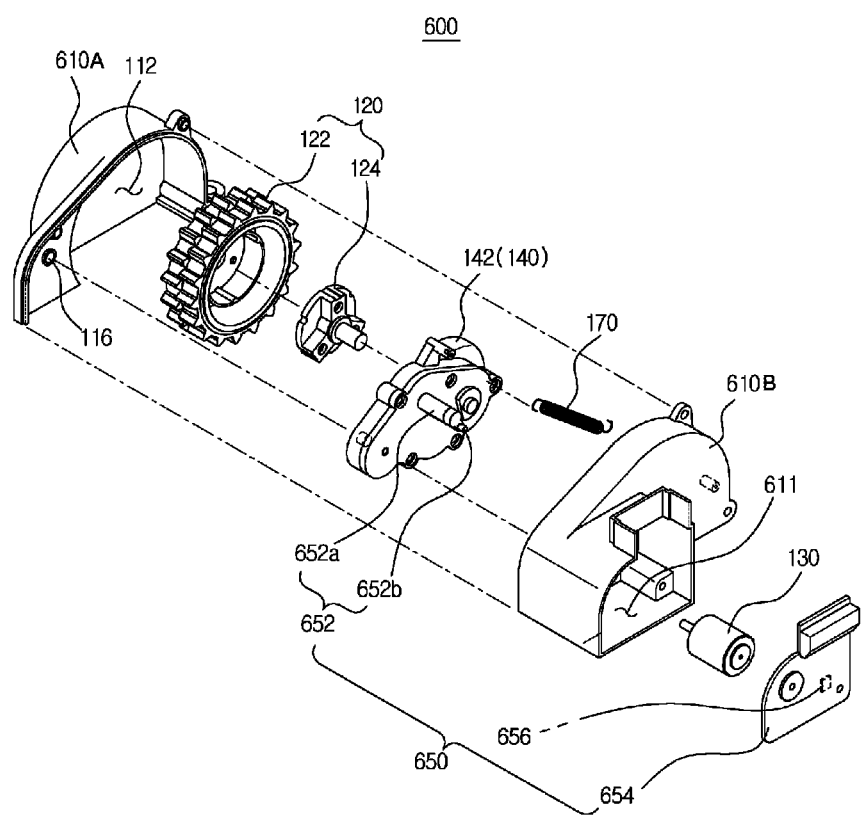
FIG. 16 is an exploded perspective view of the driving wheel assembly in accordance with the sixth embodiment.
Figure 17:
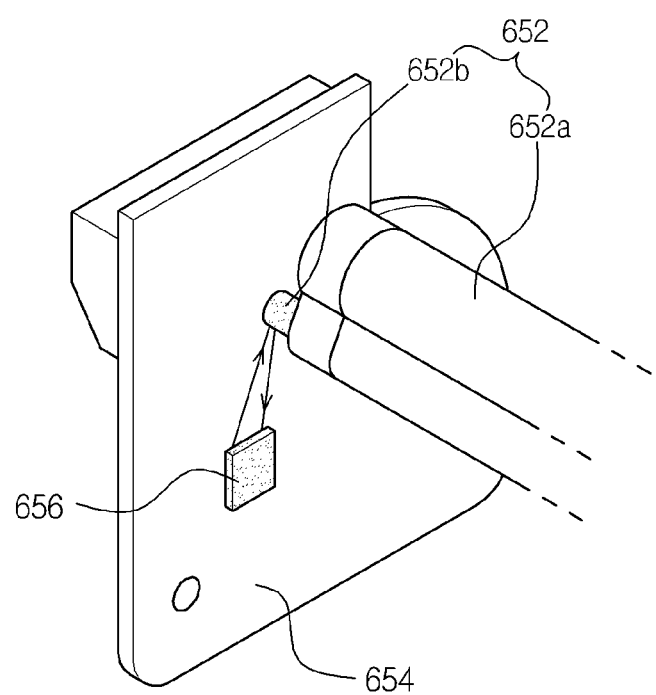
FIG. 17 is a view illustrating the sensor and the sensor target extracted from the driving wheel assembly illustrated in FIG. 15.

FIG. 15 is a perspective view illustrating the driving wheel assembly in accordance with a sixth embodiment and FIG. 16 is an exploded perspective view of the driving wheel assembly in accordance with the sixth embodiment, while FIG. 17 is a view illustrating the sensor and the sensor target extracted from the driving wheel assembly illustrated in FIG. 15.

As illustrated in FIGS. 15 to 17, a detection unit 650, which may be arranged at the driving wheel assembly 600 in accordance with the sixth embodiment of the present disclosure and may be configured to detect the displacement of the driving wheel 120, may include a sensor target 652 arranged at the gear assembly 140, a sensor 656 configured to detect the sensor target 652, and a bracket 654 configured to fix the sensor 656 to the housing 610. The housing 610 may be comprised of a first housing part 610A and a second housing part 610B.

The sensor target 652 may include a bump rib 652A which may protrude from the one side of the gear case 142 facing toward a direction of the second housing part 610B of the housing 610 and a magnet 652B which may be coupled to the one end of the bump rib 652B.

A driving motor accommodation unit 611 may be arranged at one side of the housing 610 and the bracket 654 which may be configured to support and fix the sensor 656 may be coupled to the driving motor accommodation unit 611.

The sensor 656 may be fixed to one side of the bracket 654 and may be configured to detect the gap distance from the sensor target 652 through the magnetic interaction with the magnet 652B which may move along with the gear assembly 140, and may detect the displacement of the driving wheel 120 by converting the gap distance from the sensor target 652 sensed into a standardized parameter such as a voltage.

Figure 18A:
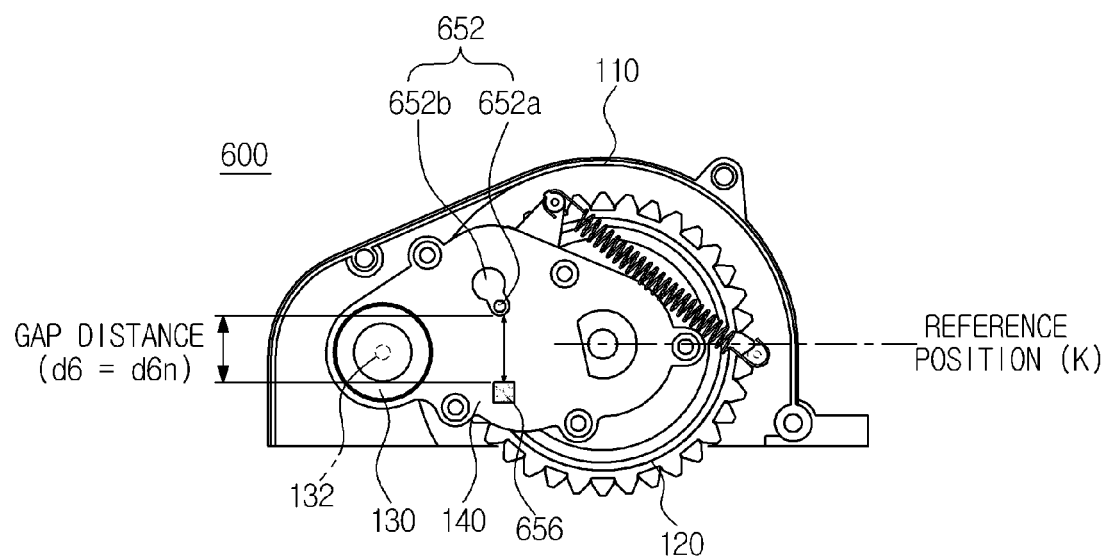
FIGS. 18A to 18C are views illustrating the change of the gap distance between the sensor and the sensor target according to the displacement of the driving wheel.
Figure 18B:
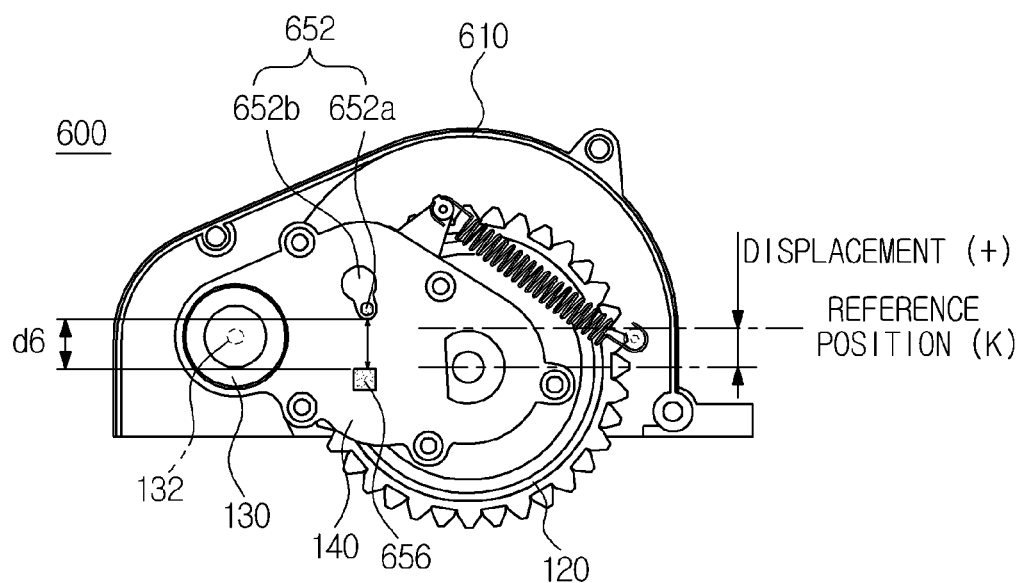
Figure 18C:
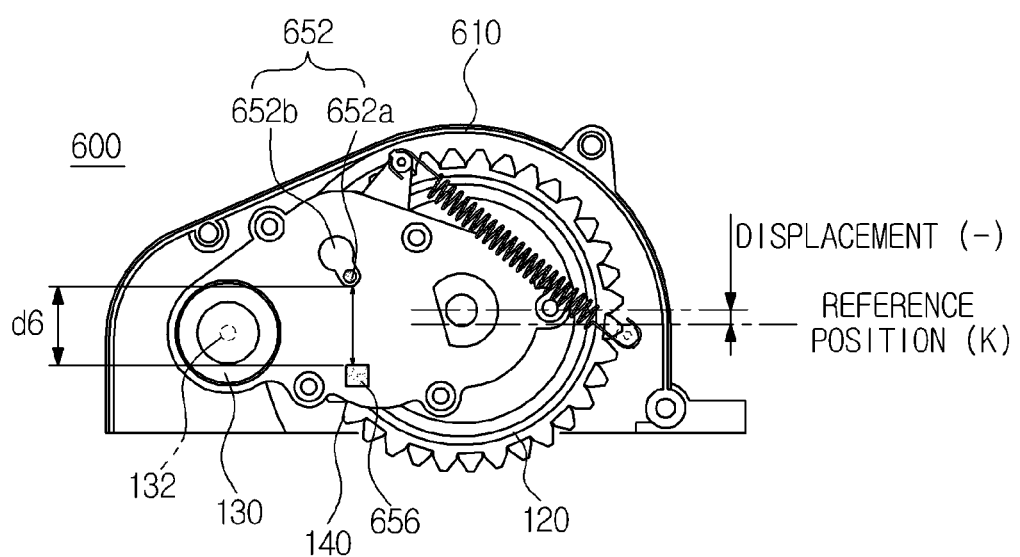
Figure 19:
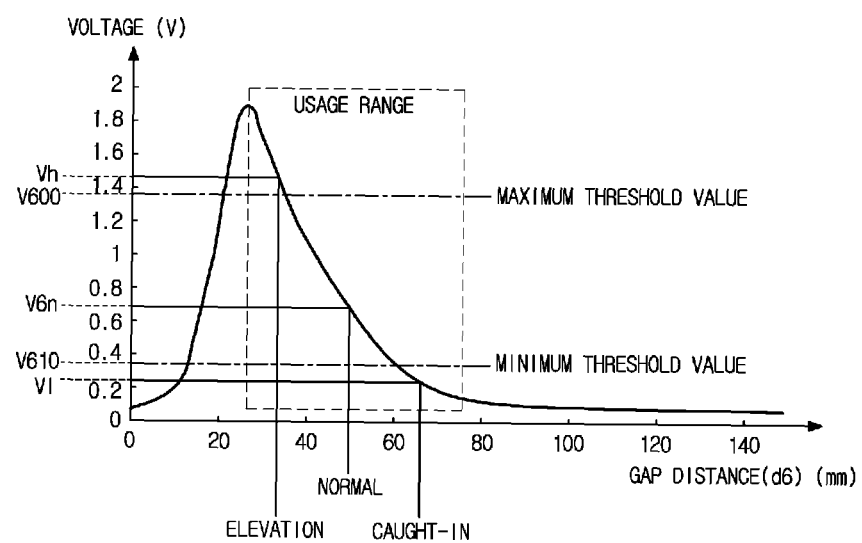
FIG. 19 is a graph illustrating the relation between the gap distance of the sensor and the sensor target and the voltage generated at the sensor.

FIGS. 18A to 18C are views illustrating the change of the gap distance between the sensor and the sensor target according to the displacement of the driving wheel, and FIG. 19 is a graph illustrating the relation between the gap distance of the sensor and the sensor target and the voltage generated at the sensor.

As illustrated in FIG. 18A, when the body 10 drives on the H/F area without a particular obstacle, the gap distance d6 between the sensor 656 and the sensor target 652 may become the reference gap distance d6n, and the displacement of the driving wheel 120 according to d6n may become 0.

As illustrated in FIG. 18B, when the body 10 encounters and drives over an inclined plane or a drive-over obstacle B1 (refer to FIGS. 20A to 20D), the gear assembly 140 may pivot in a clockwise direction while having the axle 132 of the driving motor 130 or the second coupling bump 146, which may be arranged on the same axis of rotation, as a center of rotation, and the sensor target 652 which may move along the gear assembly 140 also may pivot in a clockwise direction. That is, the gap distance d6 between the sensor 656 and the sensor target 652 may become smaller than the reference gap distance d6n.

As illustrated in FIG. 18C, when the body 10 encounters a caught-in obstacle B2 such as a table (refer to FIGS. 22A to 22D), the gear assembly 140 may pivot in a counter-clockwise direction while having the axle 132 of the driving motor 130 as a center of rotation, and the sensor 652 which may move along the gear assembly 140 also may pivot in a counter-clockwise direction. That is, the gap distance d6 between the sensor 656 and the sensor target 652 may become larger than the reference gap distance d6n.

FIG. 19 is a graph illustrating a reference which may be configured to detect the displacement of the driving wheel 120 by converting the gap distance from the sensor target 652 into a standardized parameter such as a voltage. The horizontal axis of the graph shows a gap distance d6 between the sensor 656 and the sensor target 652 and the vertical axis of the graph shows a voltage corresponding to the reference gap distance d6n between the sensor 656 and the sensor target 652.

As illustrated in FIG. 19, in a case when the gap distance d6 between the sensor 656 and the sensor target 652 is same as the reference gap distance d6n, the sensor 656 may convert such into the reference voltage V6n which corresponds to the reference gap distance d6n, and may detect the displacement of the driving wheel 120 at 0.

In a case when the gap distance d6 between the sensor 656 and the sensor target 652 becomes smaller than the reference gap distance d6n (FIG. 18B), the sensor 656 may convert such into a voltage which is higher than the reference voltage V6n that corresponds to the reference gap distance d6n, and may detect that the displacement of the driving wheel 120 is considered to have a positive (+) value. If the voltage that corresponds to the displacement of the driving wheel 120, which may be detected by the sensor 656, exceeds the maximum threshold value V600 of the prescribed reference range, the control unit 50 may determine that the body 10 is in a state of elevation and may change the driving course of the body 10 by controlling the rotation frequency of the driving motor 130 or the rotation direction.

In a case when the gap distance d6 between the sensor 656 and the sensor target 652 becomes larger than the reference gap distance d6n, the sensor 656 may convert such into a voltage which is lower than the reference voltage V6n that corresponds to the reference gap distance d6n, and may detect that the displacement of the driving wheel 120 is considered to have a negative (−) value. If the voltage that corresponds to the displacement of the driving wheel 120, which may be detected by the sensor 656, does not reach at the minimum threshold value V610 of the prescribed reference range, the control unit 50 may determine that the body 10 is in a state of caught-in and may change the driving course of the body 10 by controlling the rotation frequency of the driving motor 130 or the rotation direction.

That is, within the usage range of a sensor, the gap distance d6 between the sensor 656 and the sensor target 652 may be in a reciprocal relation to a voltage, and the voltage may be considered to be in a proportional relation to the displacement of the driving wheel 120.

Hereafter, a process of the autonomous cleaner optimally driving according to the material quality and the condition of the floor surface detected in the process of driving, a process of driving while avoiding the drive-over obstacle B1 or the caught-in obstacle, and a method of controlling thereof.

Figure 20:
FIG. 20 is a view illustrating the relation between the driving distance of the autonomous cleaner and the displacement of the driving wheel in a process of the autonomous cleaner driving on a hard floor.
Figure 21:
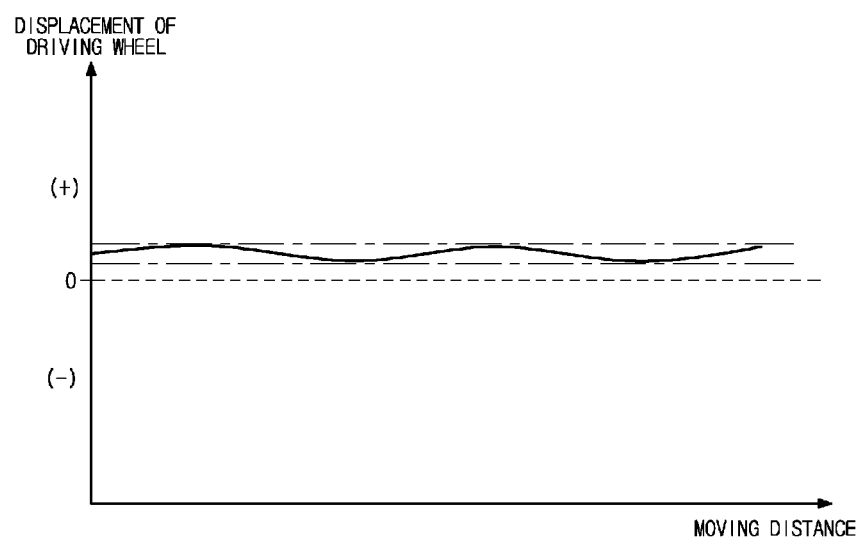
FIG. 21 is a view illustrating the relation between the driving distance of the autonomous cleaner and the displacement of the driving wheel in a process of the autonomous cleaner driving on a carpet.

FIG. 20 is a view illustrating the relation between the driving distance of the autonomous cleaner and the displacement of the driving wheel in a process of the autonomous cleaner driving on a H/F area, and FIG. 21 is a view illustrating the relation between the driving distance of the autonomous cleaner and the displacement of the driving wheel in a process of the autonomous cleaner driving on a carpet area.

As illustrated in FIG. 20, in a process of the body 10 of the autonomous cleaner 1 driving on a H/F area to conduct a cleaning task, the displacement of the driving wheel 120 which may be detected by the detection units 150, 250, 350, 450, 550, and 650 may be constantly maintained at 0, and as illustrated in FIG. 21, in a case when the body 10 of the autonomous cleaner 1 drives on a carpet area, the displacement of the driving wheel 120 which may be detected by the detection units 150, 250, 350, 450, 550, and 650 may have greater amount (+) of value than the displacement of the driving wheel 120 has when the body 10 of the autonomous cleaner 1 driving on a H/F area, and may appear to oscillate continuously within a certain range.

This may be because since the carpet area is softer than the H/F area, the driving wheel 120 may rotate in a state of the driving wheel 120 pivoted more toward clockwise direction when driving on the H/F area, that is, in a state of the driving wheel 120 being more elevated, and in addition, since the surface of the carpet area on which the driving wheel 120 makes contact is not leveled when compared to the H/F area, the driving wheel 120 may rotate while oscillating upward and downward directions.

The control unit 50, in a case when the displacement of the detection units 150, 250, 350, 450, 550, and 650 show an identical or a similar pattern as the graph illustrated on FIG. 21, may determine that the autonomous cleaner 1 is conducting a cleaning on the carpet area, and may control a driving method or a cleaning strength according to the characteristic of the carpet area. That is, by considering that the resistance applied to the driving wheel 120 and the main brush 35 or to the side brush increases on the carpet area, the torque, the rotation speed, etc. of the driving wheel 120, the main brush 35, and the side brush may be controlled to be increased to prevent the driving speed and the cleaning performance from being reduced at the same time. In addition, to reduce the resistance to the main brush 35 and the side brush (not shown), the main brush 35 or the side brush (not shown) may be controlled to be temporarily moved to an upper portion in the process of the autonomous cleaner 1 driving on the carpet area.

Figure 22A:
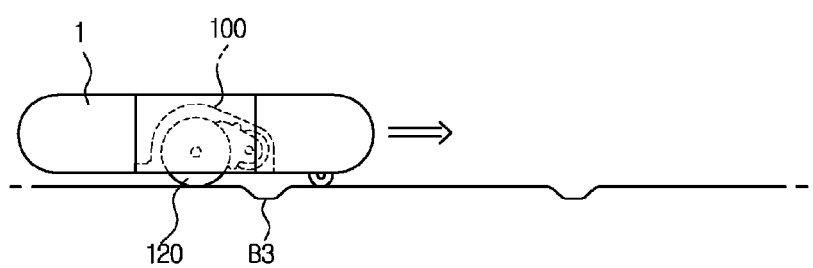
FIGS. 22A to 22C are views illustrating an autonomous cleaner driving on a tile floor in accordance with one embodiment.
Figure 22B:
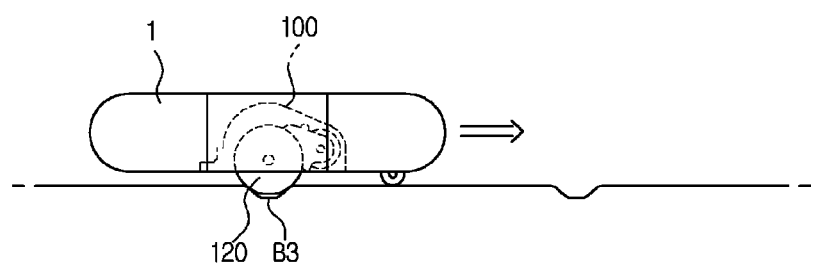
Figure 22C:
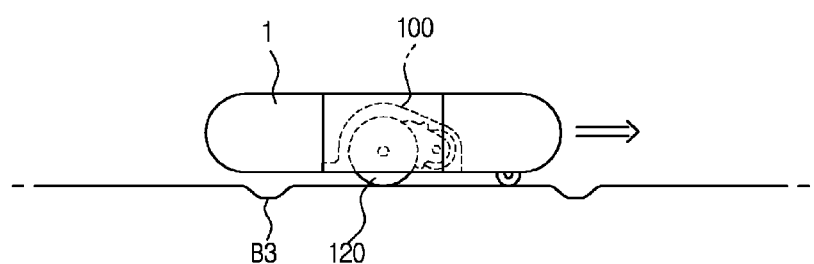
Figure 23:
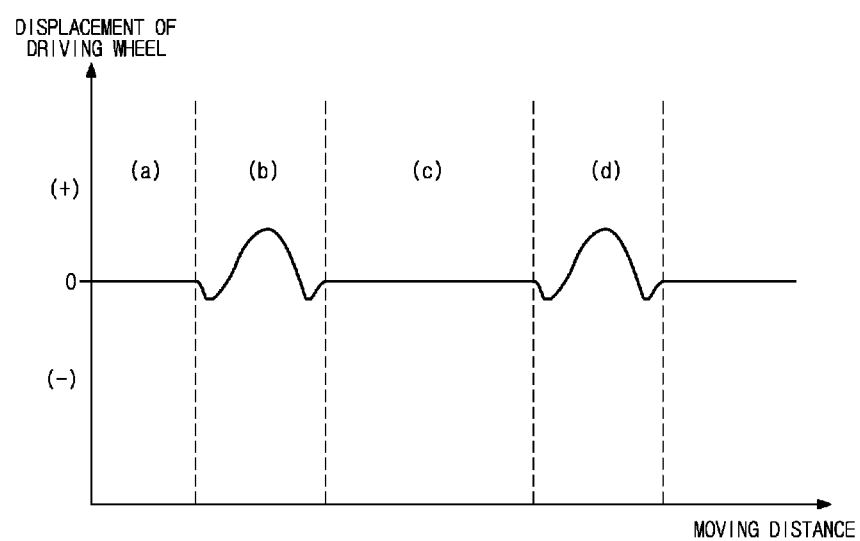
FIG. 23 is a view, in a process of the autonomous cleaner illustrated in FIGS. 22A to 22C driving on the tile floor, illustrating the relation between the driving distance of the autonomous cleaner and the displacement of the driving wheel.

FIGS. 22A to 22C are views illustrating the autonomous cleaner driving on a tile area in accordance with one embodiment, and FIG. 23 is a view, in a process of the autonomous cleaner illustrated in FIGS. 22A to 22C driving on the tile area, illustrating the relation between the driving distance of the autonomous cleaner and the displacement of the driving wheel. Here, the tile area is assumed to include a groove (B3) is formed at regular intervals.

As illustrated in FIGS. 22A to 22C and on FIG. 23, in a process of the body 10 of the autonomous cleaner 1 driving on the tile area to conduct the cleaning task, the displacement of the driving wheel 120 detected by the detection units 150, 250, 350, 450, 550, and 650 before entering on the groove B3 may be 0 (Step A).

When the body 10 of the autonomous cleaner 1 enters the groove B3, as in FIG. 22B, the displacement of the driving wheel 120 detected by the detection units 150, 250, 350, 450, 550, and 650 may be temporarily changed to a positive (+) value, then changed to a negative (−) value, and then temporarily to a positive (+) value in the process of exiting from the groove B3 (Step B). This may be because of the phenomenon that occurs by the driving wheel 120 being elevated temporarily in the process of driving on the groove B3.

When the body 10 of the autonomous cleaner 1 is completely exited from the groove B3, the displacement of the driving wheel 120 detected by the detection units 150, 250, 350, 450, 550, and 650 may become 0 again (Step C).

The control unit 50, in a case when the displacement of the detection units 150, 250, 350, 450, 550, and 650 show an identical or a similar pattern as the graph illustrated on FIG. 23, may determine that the autonomous cleaner 1 is conducting a cleaning on the tile area, and may control a driving method or a cleaning strength according to the characteristic of the tile area. That is, when the driving wheel 120 is driving on the groove B3, by temporarily increasing the torque, the rotation speed, etc. of the driving wheel 120, driving speed is controlled not to be reduced, and when the main brush 35 is passing through the groove B3, the torque, the rotation speed, etc. of the main brush 35 may be controlled to be increased to efficiently remove complied dirt, etc. at the groove B3. In addition, the driving of the autonomous cleaner 1 may be controlled, in order to increase the cleaning efficiency, in a way that the driving wheel 120 may be moved toward a perpendicular direction to the extended direction of the groove B3. In such case, in a state that the main brush 35 arranged between the driving wheel 120 is aligned in parallel with the groove B3, the accumulated dirt at the groove B3 may be removed, and thus, the cleaning efficiency may be increased.

Figure 24A:
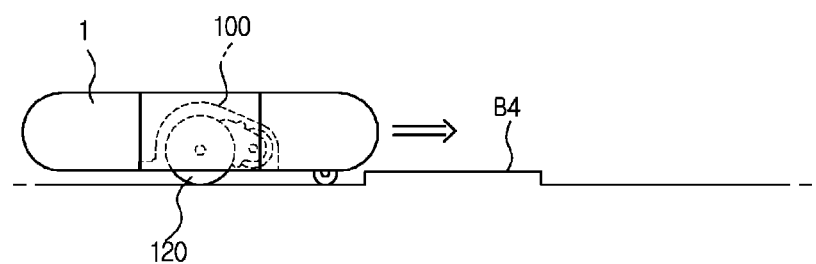
FIGS. 24A to 24D are views illustrating the autonomous cleaner in accordance with one embodiment of the present disclosure driving on a raised area.
Figure 24B:
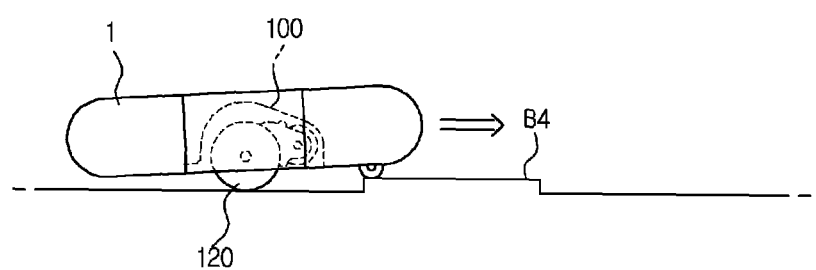
Figure 24C:
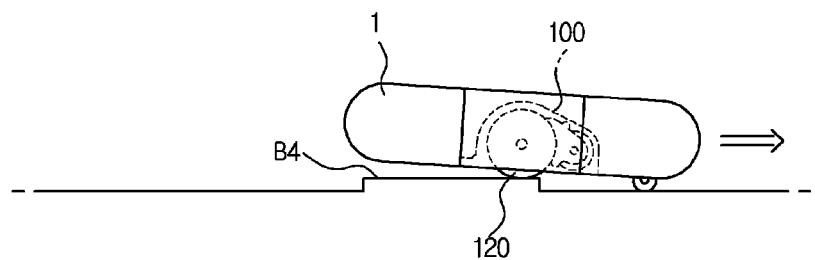
Figure 24D:
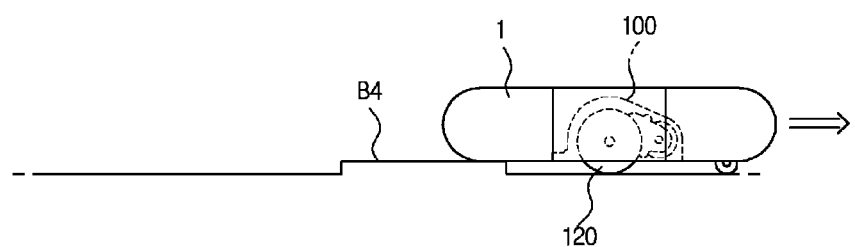
Figure 25:
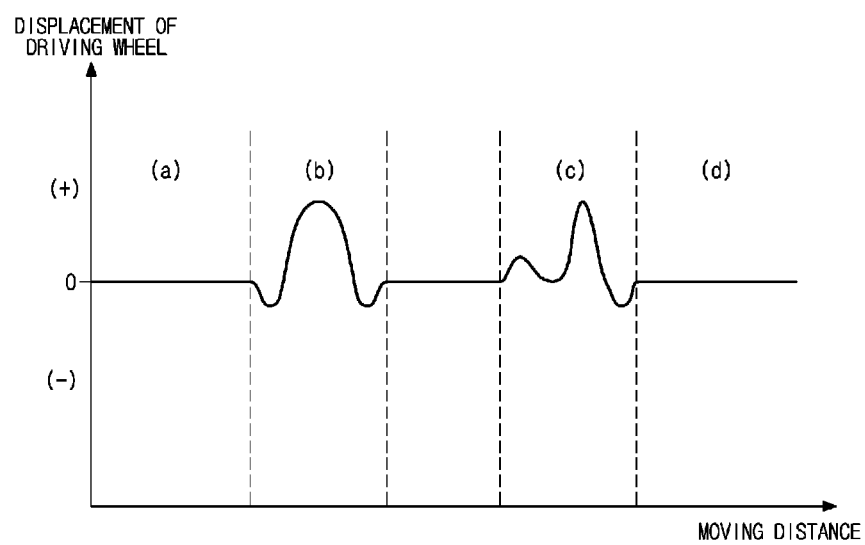
FIG. 25 is a view, in a process of the autonomous cleaner illustrated on FIGS. 24A to 24C driving on the raised area, illustrating the relation between the driving distance of the autonomous cleaner and the displacement of the driving wheel in a process of the autonomous cleaner driving on the tile floor.

FIGS. 24A to 24D are views illustrating the autonomous cleaner in accordance with one embodiment of the present disclosure driving through a raised area, and FIG. 25 is a view, in a process of the autonomous cleaner illustrated on FIGS. 24A to 24C driving on the raised area, illustrating the relation between the driving distance of the autonomous cleaner and the displacement of the driving wheel in a process of the autonomous cleaner driving on the tile area.

As illustrated in FIGS. 24A to 24D and in FIG. 25, in the process of the body 10 of the autonomous cleaner 1 driving over the raised area to conduct the cleaning task, the displacement of the driving wheel 120 detected by the detection units 150, 250, 350, 450, 550, and 650 before entering on the raised area B4 may be 0 (Step A).

When the body 10 of the autonomous cleaner 1 encounters the raised area B4, as in FIG. 24B, the displacement of the driving wheel 120 detected by the detection units 150, 250, 350, 450, 550, and 650 may be temporarily changed to a negative (−) value, then may be changed to a positive (+) value, and then may become a value approximately near 0 (Step B). This is because of the phenomenon that occurs by the driving wheel 120 being elevated temporarily in the process of driving on the raised area B4.

In the process of the body 10 of the autonomous cleaner 1 exiting from the raised area B4, as in FIG. 24C, the displacement of the driving wheel 120 detected by the detection units 150, 250, 350, 450, 550, and 650 may be changed to a positive (+) value, and then may become a value approximately near 0 (Step C). This is because of the phenomenon that occurs by the driving wheel 120 being elevated temporarily in the process of exiting from the raised area B4.

When the body 10 of the autonomous cleaner 1 is completely exited from the raised area B4, the displacement of the driving wheel 120 may become 0 again (Step D).

The control unit 50, in a case when the displacement of the detection units 150, 250, 350, 450, 550, and 650 show an identical or a similar pattern as the graph illustrated in FIG. 25, may determine that the autonomous cleaner 1 is conducting a cleaning on the raised area, and may control a driving method or a cleaning strength according to the characteristic of the raised area. That is, the displacement of the driving wheel 120 may be changed for the driving wheel 120 to easily drive over the raised area B4, by temporarily increasing the torque, the rotation speed, etc. of the driving wheel 120 in order to increase the driving speed of the driving wheel 120 and the angle of entry for the driving wheel 120 to enter the raised area B4. In addition, in order to prevent the elevation phenomenon which may occur in the process of the driving wheel 120 driving on the raised area B4, the driving wheel 120 may be controlled to move toward a perpendicular direction to the longitudinal direction of the raised area B4, and not to conduct a rotating driving on the raised area B4.

Figure 26A:
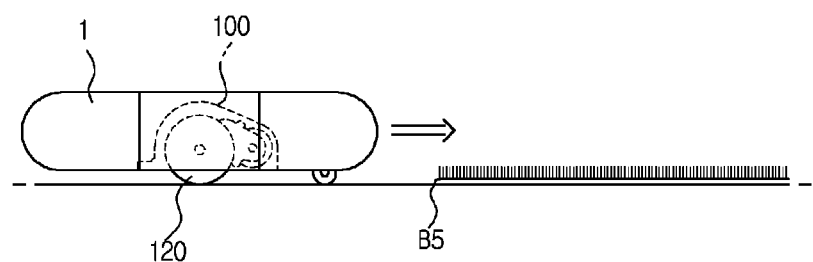
FIGS. 26A to 26C are views illustrating the autonomous cleaner in accordance with one embodiment of the present disclosure driving through an intersecting area of the floor surface having different material quality to each other.
Figure 26B:
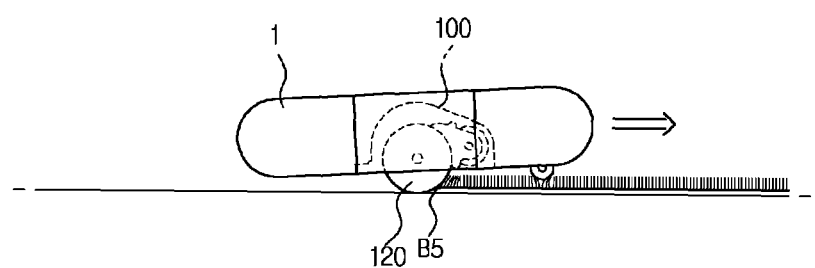
Figure 26C:
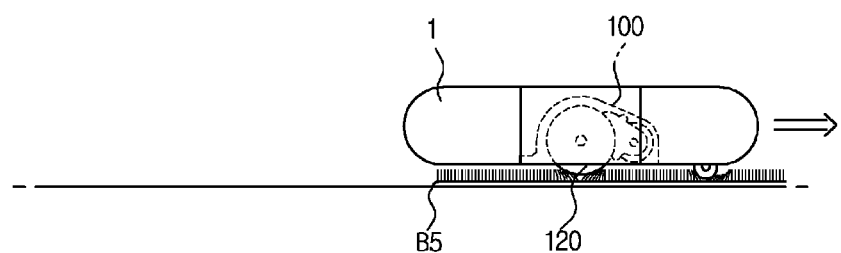
Figure 27:
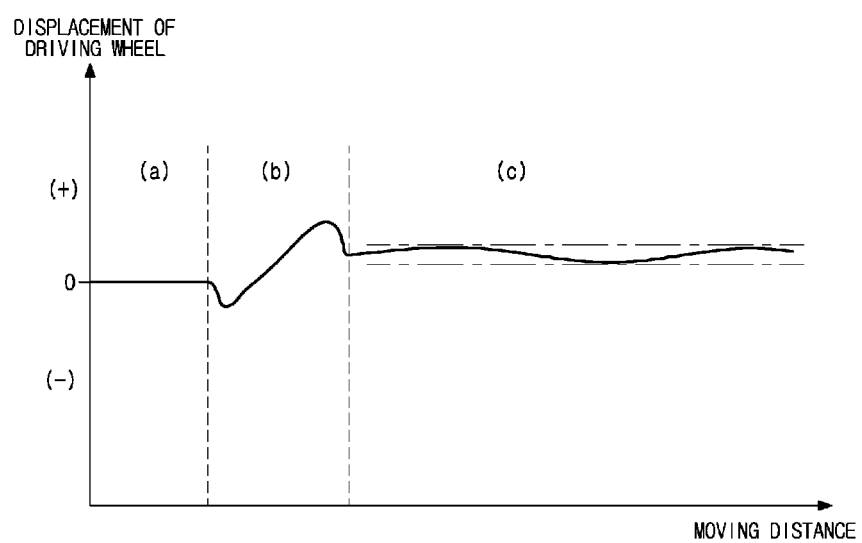
FIG. 27 is a view, in a process of the autonomous cleaner illustrated in FIGS. 26A to 26C driving through the intersecting territory, illustrating the relation between the driving distance of the autonomous cleaner and the displacement of the driving wheel.

FIGS. 26A to 26C are views illustrating the autonomous cleaner in accordance with one embodiment of the present disclosure driving through an intersecting area of the floor surface having different material quality to each other, and FIG. 27 is a view, in a process of the autonomous cleaner illustrated on FIGS. 26A to 26C driving through the intersecting area, illustrating the relation between the driving distance of the autonomous cleaner and the displacement of the driving wheel. Here, the intersecting area may be considered to include an intersecting line B5 where the H/F area and the carpet area meet, and the autonomous cleaner 1 may be considered to enter from the H/F area to the carpet area.

As illustrated in FIGS. 26A to 26C and in FIG. 27, in a process of the body 10 of the autonomous cleaner 1 driving on the intersecting area to conduct the cleaning task, the displacement of the driving wheel 120 detected by the detection units 150, 250, 350, 450, 550, and 650 before entering the intersecting line B5 may be 0 (Step A).

When the body 10 of the autonomous cleaner 1 meets the intersecting line B5, as in FIG. 26B, the displacement of the driving wheel 120 detected by the detection units 150, 250, 350, 450, 550, and 650 may be temporarily changed to a negative (−) value, and then changed to a positive (+) value (Step B). This is because of the phenomenon that occurs by the driving wheel 120 being elevated temporarily in the process of entering the intersecting line B5.

When the body 10 of the autonomous cleaner 1 is completely exited from the intersecting line B5 and enters the carpet area, the displacement of the driving wheel 120, similar with the displacement pattern of the driving wheel 120 at the carpet area explained previously, may have a greater amount (+) of value than the displacement of the driving wheel 120 has when the body 10 of the autonomous cleaner 1 driving on a H/F area, and may appear to oscillate continuously within a certain range (Step C).

The control unit 50, in a case when the displacement of the driving wheel 120 detected by the detection units 150, 250, 350, 450, 550, and 650 shows an identical or a similar pattern as the graph illustrated on FIG. 27, may determine that the autonomous cleaner 1 is conducting a cleaning on the intersecting area, and may control a driving method or a cleaning strength according to the characteristic of the intersecting area. That is, the displacement of the driving wheel 120 may be changed for the driving wheel 120 to easily drive over the intersecting line B5, by temporarily increasing the torque, the rotation speed, etc. of the driving wheel 120 in order to increase the driving speed of the driving wheel 120 and the angle of entry for the driving wheel 120 to enter the intersecting line B5. In addition, in order to prevent the elevation phenomenon which may occur in the process of the driving wheel 120 driving on the intersecting line B5, the driving wheel 120 may be controlled to be moved toward a perpendicular direction to the longitudinal direction of the intersecting line B5, and not to conduct a rotating driving on the intersecting line B5.

Figure 28A:
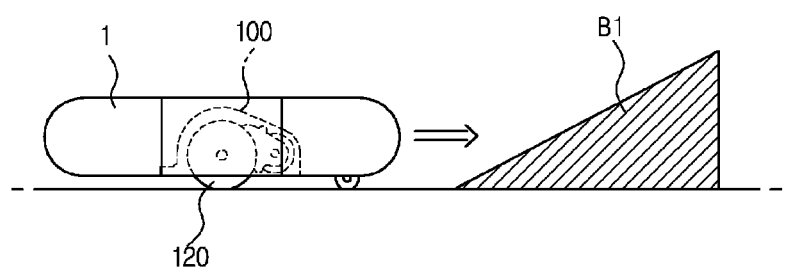
FIGS. 28A to 28D are views illustrating the autonomous cleaner in accordance with one embodiment of the present disclosure driving while avoiding a drive-over obstacle.
Figure 28B:
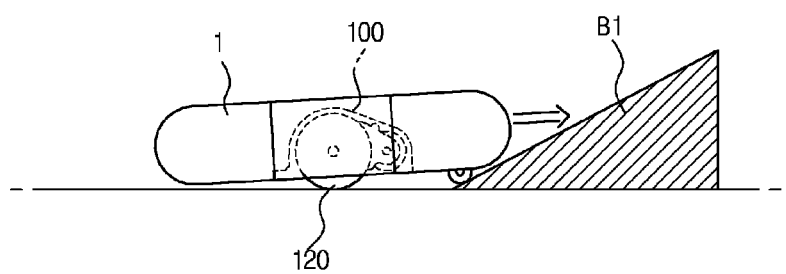
Figure 28C:
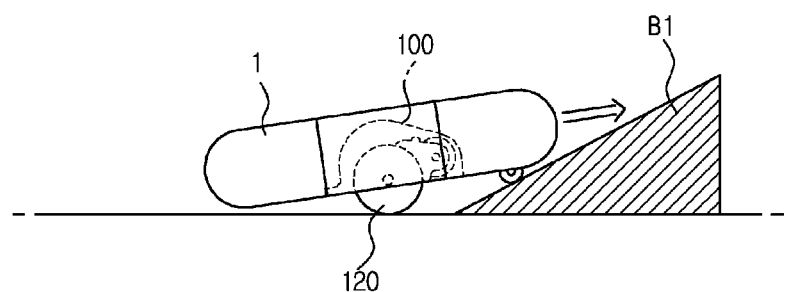
Figure 28D:
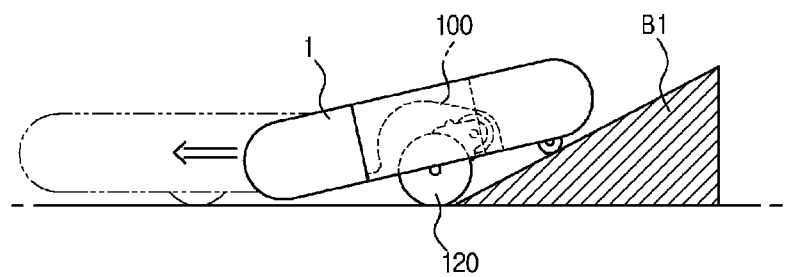
Figure 29:
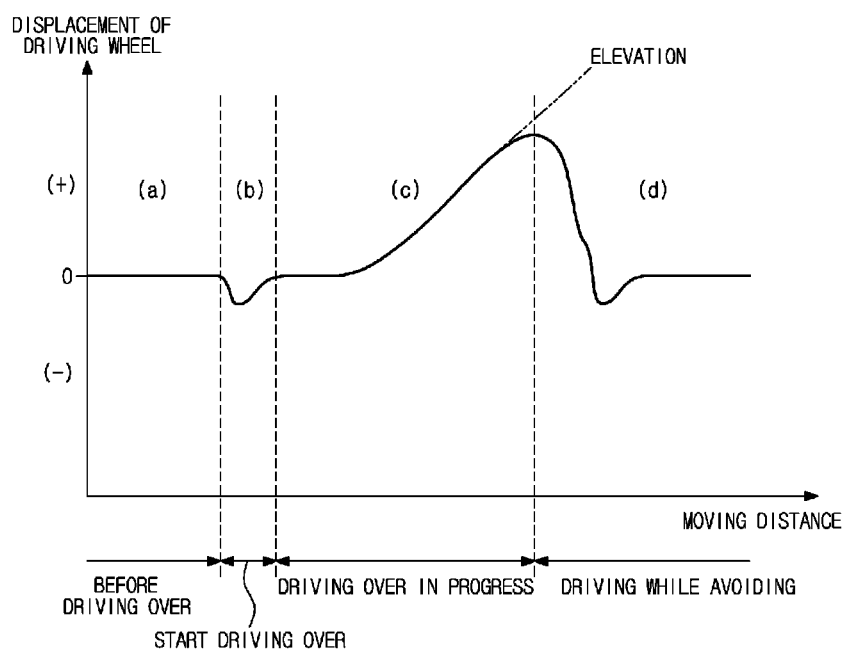
FIG. 29 is a view, in a process of the autonomous cleaner illustrated in FIGS. 28A to 28D driving while avoiding the drive-over obstacle, illustrating the relation between the driving distance of the autonomous cleaner and the displacement of the driving wheel.

FIGS. 28A to 28D are views illustrating the autonomous cleaner in accordance with one embodiment of the present disclosure driving while avoiding a drive-over obstacle, and FIG. 29 is a view, in a process of the autonomous cleaner illustrated in FIGS. 28A to 28D driving while avoiding the drive-over obstacle, illustrating the relation between the driving distance of the autonomous cleaner and the displacement of the driving wheel.

As illustrated in FIGS. 28A to 28D and in FIG. 29, in a process of the body 10 of the autonomous cleaner 1 driving on the H/F area to conduct the cleaning task, the displacement of the driving wheel 120 detected by the detection units 150, 250, 350, 450, 550, and 650 before encountering the drive-over obstacle B1 may be 0 (Step A).

When the body 10 of the autonomous cleaner 1 starts driving over the drive-over obstacle B1, as in FIG. 28B, the displacement of the driving wheel 120 detected by the detection units 150, 250, 350, 450, 550, and 650 temporarily may have a negative (−) value (Step B).

As the body 10 of the autonomous cleaner 1 continues to drive over, as in FIG. 28C, the displacement of the driving wheel 120 detected by the detection units 150, 250, 350, 450, 550, and 650 may be changed from a negative (−) value to a positive (+) value (Step B), and may continue to have the positive (+) value while the size of the displacement of the driving wheel 120 detected may be continuously increased (Step C).

The control unit 50, in a case when it is determined that the size of the displacement of the driving wheel 120 detected by the detection units 150, 250, 350, 450, 550, and 650 continues to increase and exceeded the prescribed reference range, may change the driving course of the body 10 of the autonomous cleaner 1 to drive while avoiding the drive-over obstacle B1 (Step D) as in FIG. 28D.

Figure 30A:
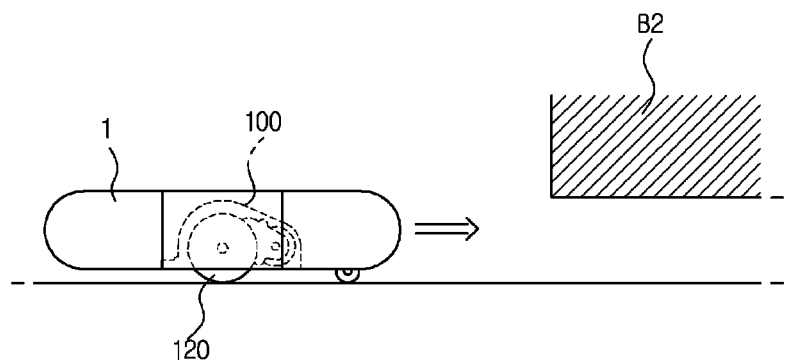
FIGS. 30A to 30D are views illustrating the autonomous cleaner in accordance with one embodiment of the present disclosure driving while avoiding a caught-in obstacle.
Figure 30B:
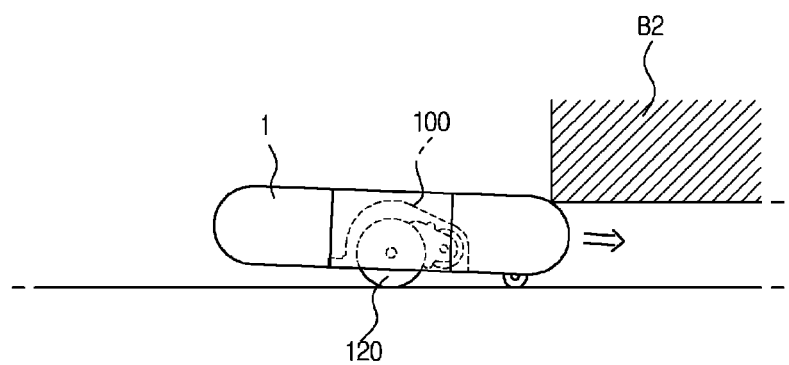
Figure 30C:
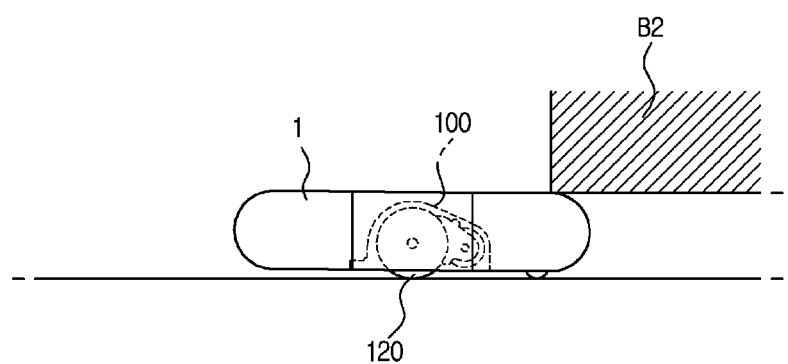
Figure 30D:
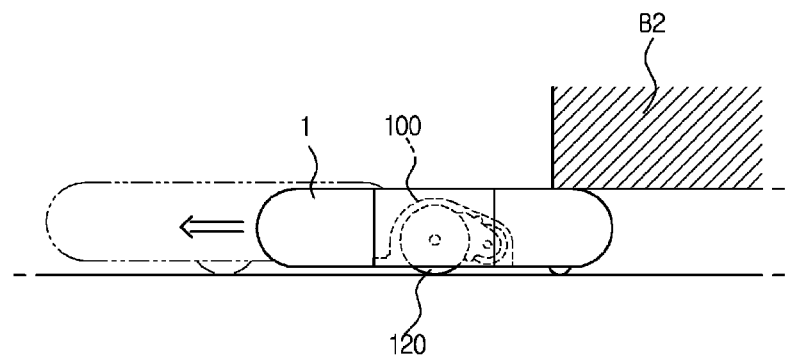
Figure 31:
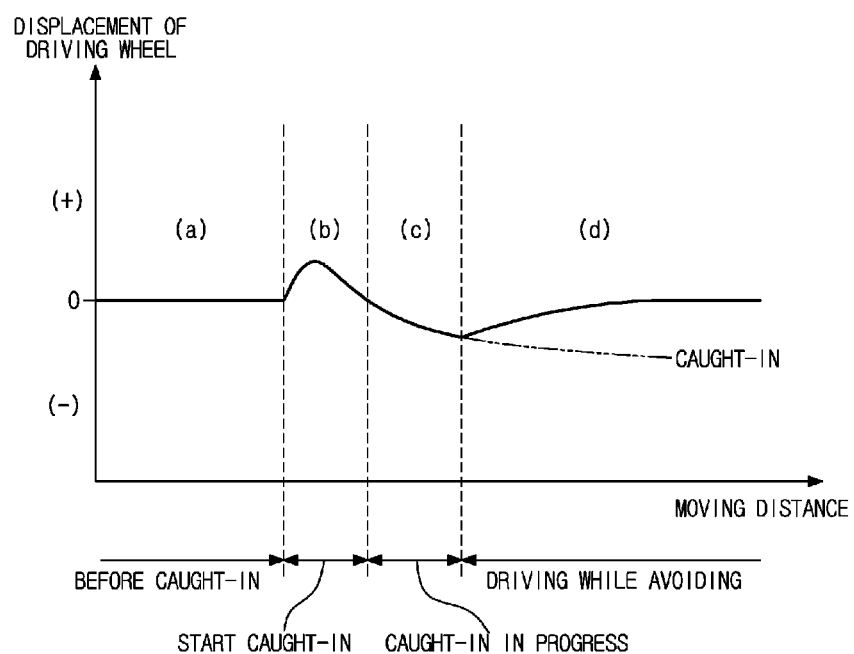
FIG. 31 is a view, in a process of the autonomous cleaner illustrated in FIGS. 30A to 30D driving while avoiding the caught-in obstacle, illustrating the relation between the driving distance of the autonomous cleaner and the displacement of the driving wheel.

FIGS. 30A to 30D are views illustrating the autonomous cleaner in accordance with one embodiment of the present disclosure driving while avoiding a caught-in obstacle, and FIG. 31 is a view, in a process of the autonomous cleaner illustrated in FIGS. 30A to 30D driving while avoiding the caught-in obstacle, illustrating the relation between the driving distance of the autonomous cleaner and the displacement of the driving wheel.

As illustrated in FIGS. 30A to 30D and in FIG. 31, in the process of the body 10 of the autonomous cleaner 1 driving over the H/F area to conduct the cleaning task, the displacement of the driving wheel 120 detected by the detection units 150, 250, 350, 450, 550, and 650 may be 0 (Step A).

When the body 10 of the autonomous cleaner 1 encounters with the caught-in obstacle B2 and is caught in, as in FIG. 30B, the displacement of the driving wheel 120 detected by the detection units 150, 250, 350, 450, 550, and 650 may temporarily have a positive (+) value (Step B).

As the body 10 of the autonomous cleaner 1 continues to remain at the caught-in, as in FIG. 30C, the displacement of the driving wheel 120 detected by the detection units 150, 250, 350, 450, 550, and 650 may be changed from a positive (+) value to a negative (−) value, and may continue to have the negative (−) value while the size of the displacement of the driving wheel 120 detected may be continuously increased (Step C).

The control unit 50, in a case when it is determined that the size of the displacement of the driving wheel 120 detected by the detection units 150, 250, 350, 450, 550, and 650 continues to increase and exceeds the prescribed reference range, in order to prevent the caught-in phenomenon, may change the driving course of the body 10 of the autonomous cleaner 1 to drive while avoiding the caught-in obstacle B2 (Step D) as depicted in FIG. 30D.

As such, the control unit 50 may determine the material quality of the condition of the floor surface according to the displacement pattern of the driving wheel 120 which may be detected by the detection units 150, 250, 350, 450, 550, and 650, may optimally control the driving of the autonomous cleaner 1, and by determining the type of an obstacle, may control the autonomous cleaner 1 to drive while avoiding the obstacle.

In addition, the control unit 50 may provide a map which displays the information about the cleaning space collected in the process of conducting a cleaning, that is, the material quality or the condition of the floor surface, the type of the obstacle, etc., and may use the map as data for controlling the driving in the process of conducting the cleaning at the cleaning space.

Figure 32:
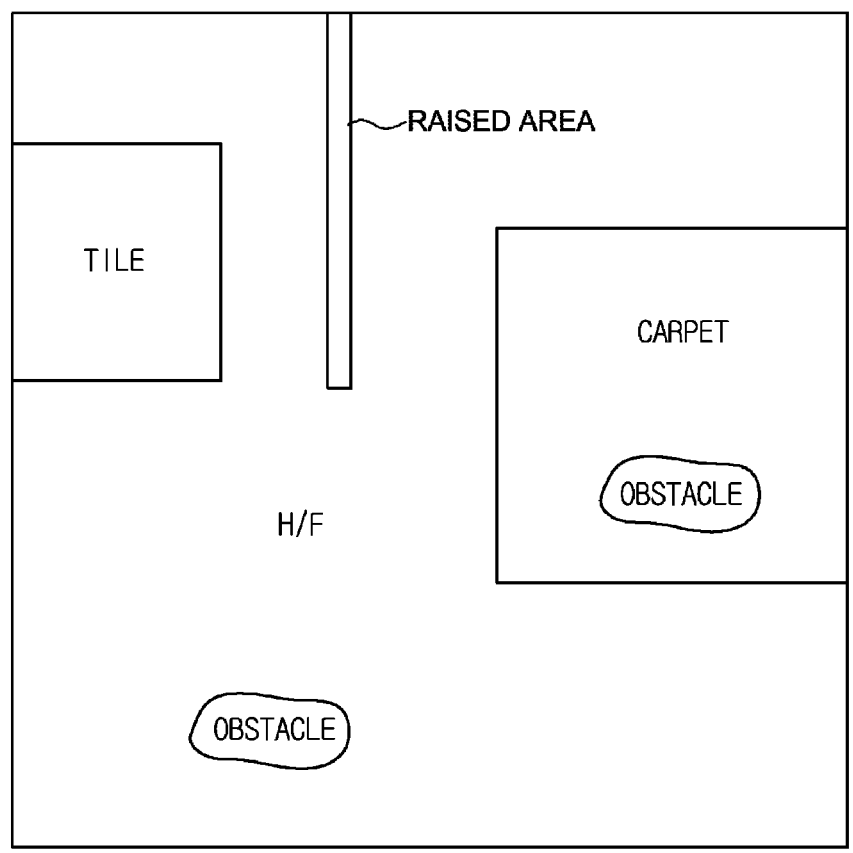
FIG. 32 is a view illustrating an entire cleaning area and where the hard floor, the carpet floor, the tile floor, the raised area, the intersecting floors, and an obstacle exist.
Figure 33:
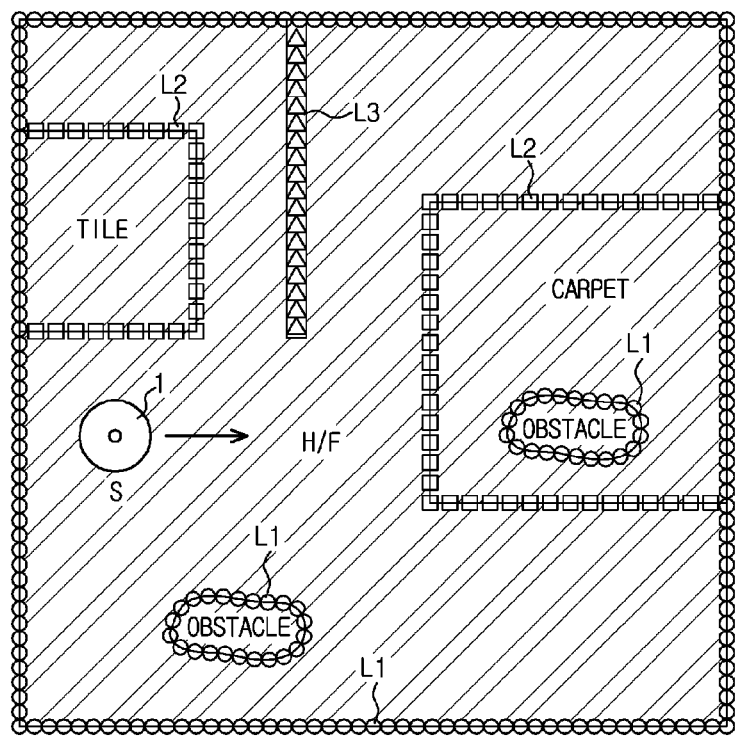
FIG. 33 is a view illustrating a map provided by the result of a cleaning task conducted by the autonomous cleaner in accordance with one embodiment of the present disclosure.

FIG. 32 is a view illustrating an entire cleaning area at where the hard floor area, the carpet area, the tile area, the raised area, the intersecting area, and an obstacle exist, and FIG. 33 is a view illustrating a map provided by the result of a cleaning task conducted by the autonomous cleaner in accordance with one embodiment of the present disclosure.

As illustrated in FIG. 32, the H/F area, the carpet area, and the tile area are arranged at the entire cleaning area. An obstacle, which may be referred to as one embodiment of the raised area, is arranged at the H/F area and the carpet area, and the intersecting area is formed at the portion at where the H/F area and the carpet area intersect. In addition, the prerequisite is made that the perimeter of the entire cleaning area is surrounded by a wall.

In a case when the autonomous cleaner 1 has completed the cleaning task on the entire cleaning area, a map with reference to the entire cleaning area, as illustrated in FIG. 33, may be generated.

When the autonomous cleaner 1 starts the driving (the cleaning) and enters the intersecting area of the H/F area, the carpet area, and the tile area, the control unit 50, through the interpretation of the displacement pattern of the driving wheel 120, may recognize each of the H/F area, the carpet area, and the tile area. At this time, the control unit 50, at the moment when the autonomous cleaner 1 drives through the intersecting area, may mark the intersecting location with a dot having a rectangular form on the map.

When the autonomous cleaner 1 drives on the H/F area, the carpet area, and the tile area, the control unit 50 may control the autonomous cleaner 1 to optimally conduct the cleaning motion according to each area. For example, by increasing the torque, rotation speed, etc. of the driving wheel 120 and the main brush 35 at the carpet area, the driving speed may be controlled not to be reduced, and at the same time, the cleaning performance may be controlled not to be decreased, or the repetitive driving at least more than twice on the carpet area may be controlled. With reference to the H/F area or the tile area having relatively less amount of dust compared to the carpet area, the cleaning may be controlled to take place in a single driving, or may also be controlled by a method of reducing the torque and the rotation speed of the main brush 35 and the side brush.

The control unit 50, at every moment when the autonomous cleaner 1 drives through the intersecting area, may mark such intersecting locations on the map with a dot having a rectangular form, and after the cleaning motion is completed, may form an intersecting line L2 connecting the dots having a rectangular form. In addition, the control unit 50, through the interpretation on the displacement pattern of the driving wheel 120, may recognize the raised area such as a threshold, and at every moment when the autonomous cleaner 1 drives through the raised area, may mark such intersecting locations on the map with a dot having a triangular form; and after the cleaning motion is completed, may form an intersecting line L3 connecting the dots having a triangular form. In addition, the control unit 50 may detect the obstacle such as the drive-over obstacle B1, the caught-in obstacle, etc., and at every moment when the obstacle is detected, may mark such detection points on the map with a dot having a circular form; and after the cleaning motion is completed, may form an obstacle line L1 connecting the dots having a circular form.

After the cleaning motion is completed, as illustrated in FIG. 33, the intersecting line L2 may be marked on the intersecting area of the H/F area and the carpet area, or the H/F area and the tile area on the map with reference to the entire cleaning area, the raised area line L3 may be marked on the raised area such as the threshold, the obstacle line L1 may be marked with reference to the obstacles which exist within the H/F area and the carpet area, and the area where the cleaning is conducted (area with slash lines) with reference to the entire cleaning area may be marked.

Figure 34:
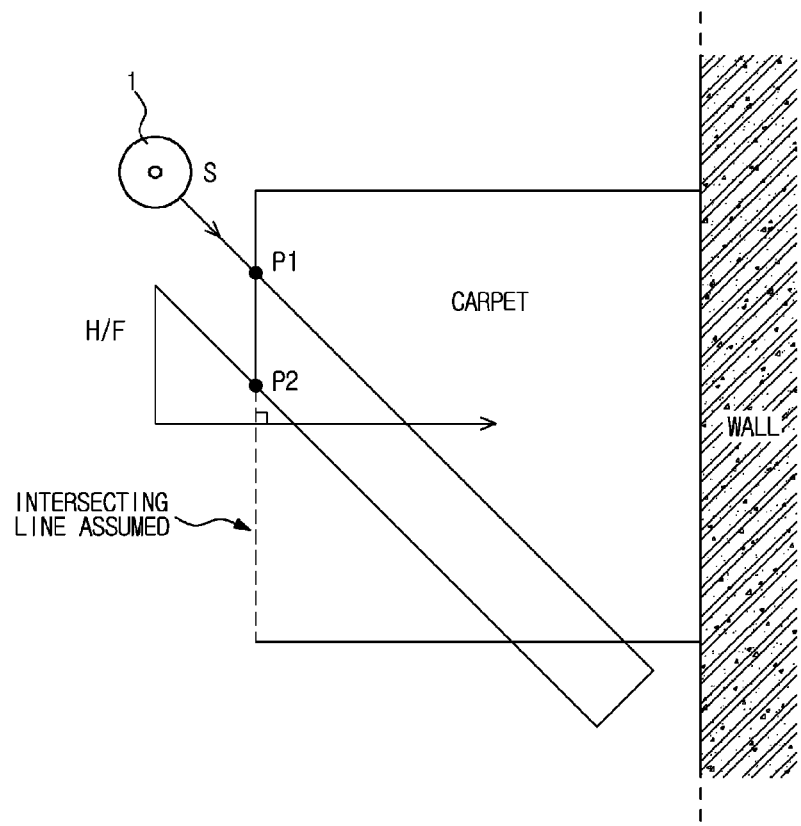
FIG. 34 is a view illustrating a method of the autonomous cleaner in accordance with one embodiment of the present disclosure estimating an intersecting line and driving toward a vertical direction of the intersecting line estimated.

FIG. 34 is a view for explaining a method of the autonomous cleaner in accordance with one embodiment of the present disclosure estimating an intersecting line and driving toward a vertical direction of the intersecting line estimated.

FIG. 34 illustrates a case when the autonomous cleaner 1 drives in a zigzag pattern. When the autonomous cleaner 1 starts the driving (the cleaning) from the location S and drives through the intersecting area P1 of the H/F area and the carpet area, the control unit 50 through the interpretation on the displacement pattern of the driving wheel 120, may recognize the intersecting area of the H/F area and the carpet area. At this time, the control unit 50 may mark the intersecting location P1 on the map at the time when the autonomous cleaner 1 drives through the intersecting area. When the autonomous cleaner 1 drives through the location P1, drives in a zigzag pattern, and then drives again through the intersecting area P2 of the carpet area and the H/F area, the control unit 50, through the interpretation on the displacement pattern of the driving wheel 120, may recognize the intersecting area of the H/F area and the carpet area. At this time, the control unit 50 may mark the intersecting location P2 on the map at the time when the autonomous cleaner 1 drives through the intersecting area. The control unit 50, while the autonomous cleaner 1 drives in a zigzag pattern, may recognize the points P1 and the P2 where the H/F area and the carpet area intersect, and may assume that the straight line which is illustrated as the dotted line and is formed by connecting the P1 and the P2 illustrated on FIG. 34 is the intersecting line that represents the intersecting area of the H/F area and the carpet area. The control unit 50, after the autonomous cleaner drives through the location P2, may control toward a perpendicular direction with reference to the assumed intersecting line. In addition, the control unit 50, when the autonomous cleaner 1 drives in the vicinity of the assumed intersecting line, may control the autonomous cleaner not to conduct a rotation driving if possible. Through such, the elevation phenomenon may be prevented when the autonomous cleaner 1 may drive through the intersecting area of the H/F area and the carpet area.

Previously, by referring to FIG. 34, although the method of assuming the intersecting line where of the autonomous cleaner 1 drives through, that is, the intersecting area of the H/F area and the carpet area, is explained, the intersecting line or the raised area line, in the same manner of the method previously described, may also be assumed in a case when the autonomous cleaner 1 drives through the intersecting area of the H/F area and the tile area, or the intersecting area of the tile area and the carpet area, or in a case when the autonomous cleaner 1 drives over the raised area such as the threshold or a stair.

Figure 35:
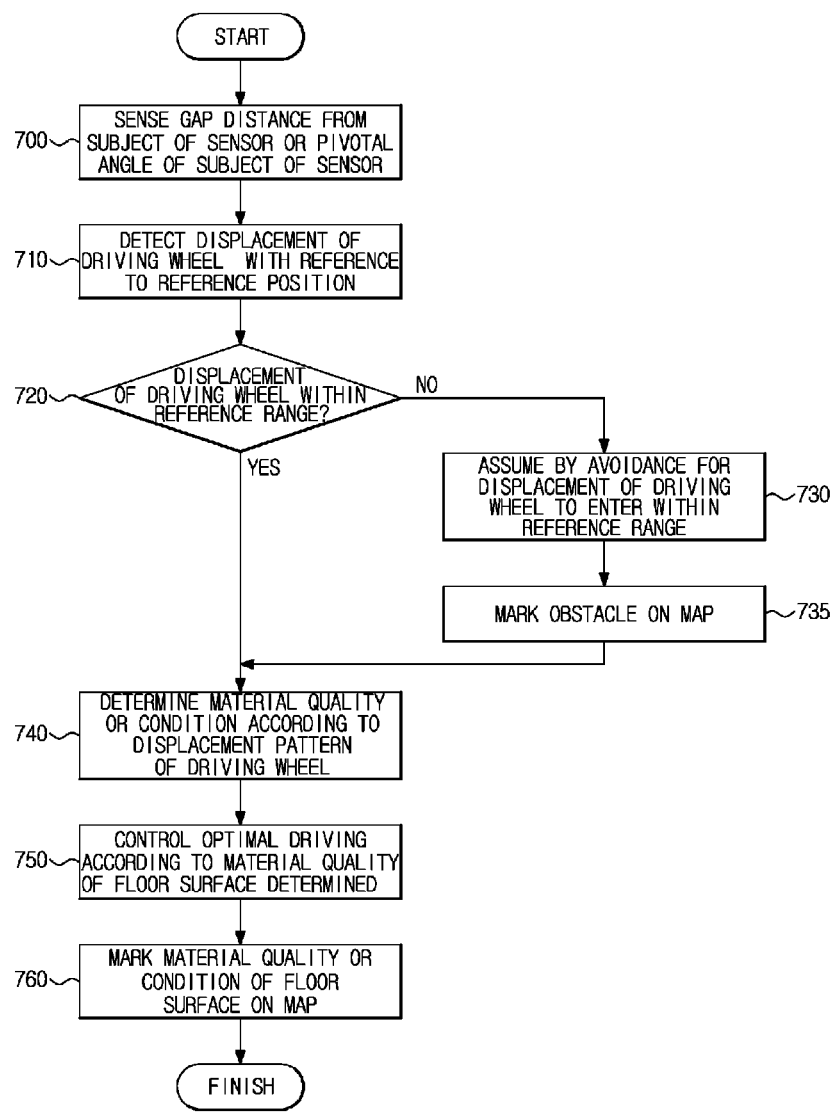
FIG. 35 is a flow chart illustrating a method of controlling the autonomous cleaner in accordance with one embodiment of the present disclosure.

FIG. 35 is a flow chart illustrating a method of controlling the autonomous cleaner in accordance with one embodiment of the present disclosure.

When the driving of the autonomous cleaner is started, the sensors 156, 256, 356, 456, 556, and 656 may sense (700) the sensor target 152, 252, 352, and 652, the gap distance from the driving wheel 120, or the pivotal angle of the driving wheel 120, and may detect (710) the displacement of the driving wheel 120 with reference to the reference position K. At this time, as previously explained, the sensors 156, 256, 356, 456, 556, and 656 may convert the gap distance sensed into a standardized parameter such as a voltage and detect the displacement of the driving wheel 120.

The displacement of the driving wheel 120 which may be detected by the sensors 156, 256, 356, 456, 556, and 656 may be transmitted to the control unit 50, and the control unit 50 may compare the displacement of the driving wheel 120 transmitted with the prescribed reference range.

When it is determined that the displacement of the driving wheel 120 is out of the reference range, the control unit 50 may control that the body 10 of the autonomous cleaner 1 changes the current driving course to drive by following the new driving course.

That is, in a process of the body 10 of the autonomous cleaner 1 encountering and driving over the inclined plane or the drive-over obstacle B1, the driving wheel 120 may be excessively elevated and it may be determined that the displacement of the driving wheel 120 which may be detected by the sensors 156, 256, 356, 456, 556, and 656 may be out of the reference range, the body 10 of the autonomous cleaner 1 may be controlled to drive while avoiding the drive-over obstacle B1 so that the displacement of the driving wheel 120 may be maintained within the reference range, and in a case when the body 10 of the autonomous cleaner 1 encounters and is excessively caught in at the caught-in obstacle B2 which is positioned on the driving course and it is determined that the displacement of the driving wheel 120 which may be detected by the sensors 156, 256, 356, 456, 556, and 656 is out of the reference range, the body 10 of the autonomous cleaner 1 may be controlled to drive while avoiding the caught-in obstacle B2 so that the displacement of the driving wheel 120 is maintained within the reference range The control unit 50, in a process in which the autonomous cleaner 1 is driving while avoiding the drive-over obstacle B1, the caught-in obstacle B2, etc., may provide a map which displays the type of obstacle and the location of the obstacle.

When it is determined that the displacement of the driving wheel 120 is within the prescribed reference range, the control unit 50 may control the body 10 of the autonomous cleaner 1 to continue moving by following the current driving course, may determine the material quality or the condition of the floor surface according to the displacement pattern of the driving wheel 120 which may be detected by the sensors 156, 256, 356, 456, 556, and 656 at the same time, and may control (740) the autonomous cleaner 1 to optimally drive according to the material quality or the condition of the floor surface. For example, when the floor surface is determined as the carpet area, the torque, the rotation speed, etc. of the driving wheel 120 and the main brush 35 may be increased on order for the driving speed not to be reduced, and at the same time, the driving method, the cleaning strength, etc. may be controlled according to the characteristic of the carpet area. When the floor surface is determined as the tile area, the torque, the rotation speed, etc. of the driving wheel 120 may be temporarily increased when the driving wheel 120 drives over the groove B3, in order for the driving speed not to be reduced, and the torque, the rotation speed, etc. of the main brush 35 may be temporarily increased when the main brush 35 passes through the groove B3, in order for the compiled dust, etc. at the groove B3 to be efficiently removed, and as such, the driving method, the cleaning strength, etc. may be controlled according to the characteristic of the tile area. When the floor surface is determined as the raised area or the intersecting area, the driving wheel 120 may be controlled to move toward a perpendicular direction to the longitudinal direction of the raised area B4 or the intersecting line B5, and not to conduct a rotating driving on the raised area B4 or the intersecting line B5.

In addition, the control unit 50, while the autonomous cleaner 1 is driving according to the material quality and the condition of the floor surface, may provide a map which displays the material quality and the condition of the floor surface.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the image processing apparatus described herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling an autonomous cleaner comprising a body, and at least one driving wheel assembly to drive the body, the at least one driving wheel assembly having a driving wheel, a driving motor to drive the driving wheel and a housing accommodating the driving wheel and the driving motor, the method comprising:
    detecting, by a sensor, a displacement of the driving wheel corresponding to a reference position by sensing a sensor target, the sensor target provided to be movable with the driving wheel inside the housing;
    determining, by one or more processors, material quality or condition of a floor surface according to the displacement of the driving wheel, and
    controlling a driving of the autonomous cleaner according to the determined material quality or the condition of the floor surface.

2. The method of controlling the autonomous cleaner of claim 1,
    wherein the sensor is configured to sense a gap distance between the sensor and the sensor target.

3. The method of controlling the autonomous cleaner of claim 2, wherein when the gap distance between the sensor and the sensor target is maintained at a constant value, it is determined that the autonomous cleaner is driving on a hard floor area.

4. The method of controlling the autonomous cleaner of claim 2, wherein when the gap distance between the sensor and the sensor target is substantially changed while having a constant period, it is determined that the autonomous cleaner is driving on a tile area.

5. The method of controlling the autonomous cleaner of claim 2, wherein when the gap distance between the sensor and the sensor target is continuously fluctuating within a constant range, it is determined that the autonomous cleaner is driving on a carpet area.

6. The method of controlling the autonomous cleaner of claim 2, wherein when the gap distance between the sensor and the sensor target is substantially increased or substantially decreased, it is determined that the autonomous cleaner is driving on an intersecting area of a hard floor area and a carpet area, or on a raised area.

7. The method of controlling the autonomous cleaner of claim 1, wherein the controlling the driving of the autonomous cleaner comprises adjusting the torque or the rotation frequency of the driving wheel according to the determined material quality or the condition of the floor surface.

8. The method of controlling the autonomous cleaner of claim 1, further comprising:
    determining whether the displacement of the driving wheel is within a predetermined reference range; and
    changing the driving course of the autonomous cleaner such that the displacement of the driving wheel is within the reference range when the determined displacement of the driving wheel is out of the reference range.

9. The method of controlling the autonomous cleaner of claim 1, wherein the sensor target is the driving wheel.

10. An autonomous cleaner comprising:
    a body;
    at least one driving wheel assembly to drive the body;
    the at least one driving wheel assembly having a driving wheel, a driving motor to drive the driving wheel and a housing accommodating the driving wheel and the driving motor;
    a sensor target provided to be movable with the driving wheel inside the housing;

a sensor configured to sense a displacement of the driving wheel corresponding to a reference position by sensing the sensor target; and at least one processor which provides a control unit configured to determine material quality or condition of a floor surface according to the displacement of the driving wheel, and to control a driving of the autonomous cleaner according to the determined material quality or the condition of the floor surface.

11. The autonomous cleaner of claim 10, wherein when the displacement of the driving wheel is maintained at a constant value the control unit determines that the autonomous cleaner is driving on a hard floor area.

12. The autonomous cleaner of claim 10, wherein when the displacement of the driving wheel is substantially changed while having a constant period the control unit determines that the autonomous cleaner is driving on a tile area.

13. The autonomous cleaner of claim 10, wherein when the displacement of the driving wheel is continuously fluctuating within a constant range the control unit determines that the autonomous cleaner is driving on a carpet area.

14. The autonomous cleaner of claim 10, wherein when the displacement of the driving wheel is substantially increased or substantially decreased, the control unit determines that the autonomous cleaner is driving on an intersecting territory of a hard floor area and a carpet area, or on a raised area.

15. The autonomous cleaner of claim 10, wherein the control unit is configured to determine whether the displacement of the driving wheel is within a predetermined reference range and, to change the driving course of the autonomous cleaner so that the displacement of the driving wheel is within the reference range when the control unit determines that the displacement of the driving wheel is out of the reference range.

16. The autonomous cleaner of claim 10, wherein the control unit is configured to determine that the autonomous cleaner is driving over a drive-over obstacle when the displacement of the driving wheel has a positive value and continuously increases, and to control the autonomous cleaner to drive while avoiding the drive-over obstacle when the displacement of the driving wheel continuously increases and reaches the established maximum threshold value.

17. The autonomous cleaner of claim 10, wherein the control unit is configured to determine that the autonomous cleaner is passing a caught-in obstacle when the displacement of the driving wheel has a negative value and decreases continuously, and to control the autonomous cleaner to drive while avoiding the caught-in obstacle in a case when the displacement of the driving wheel is continuously increases and reaches the established minimum threshold value.

18. The autonomous cleaner of claim 10, wherein the control unit is configured to provide a map with reference to the area where the autonomous cleaner drives according to a displacement pattern of the driving wheel detected by the sensor, and one or more of a hard floor area, a tile area, a carpet area, an intersecting area, a raised area, a drive-over obstacle, and a caught-in obstacle are encoded on the map.

19. The autonomous cleaner of claim 18, wherein the control unit is configured to control the autonomous cleaner to drive in a direction perpendicular to a longitudinal direction of the intersecting area or the raised area by using the map.

20. The autonomous cleaner of claim 18, wherein the control unit is configured to control the autonomous cleaner not to simultaneously drive on areas having different material quality to each other by using the map.

21. The autonomous cleaner of claim 18, wherein the control unit is configured to control the autonomous cleaner to drive while avoiding the drive-over obstacle or the caught-in obstacle by using the map.

22. The autonomous cleaner of claim 10, wherein the sensor detects the gap distance between the sensor and the sensor target.

23. The autonomous cleaner of claim 10, wherein the sensor target is the driving wheel.

24. An autonomous cleaner comprising:
a body;
a driving wheel to drive the body;
a driving wheel assembly having the driving wheel;
a sensor target provided at the driving wheel assembly;
a sensor configured to sense a displacement of the driving wheel corresponding to a reference position by sensing the sensor target; and
at least one processor which provides a control unit configured to determine material quality or condition of a floor surface according to a displacement pattern of the driving wheel, and to provide a map which encodes the determined material quality or the condition of the floor surface.

25. The autonomous cleaner of claim 24, wherein the control unit differently controls the driving of the autonomous cleaner according to the material quality or the condition of the floor surface which is encoded on the map.

26. The autonomous cleaner of claim 24, wherein the control unit determines a type of an obstacle according to the displacement pattern of the driving wheel, and encodes the determined type and location of the obstacle on the map.

27. The autonomous cleaner of claim 26, wherein the control unit controls the autonomous cleaner to drive while avoiding the obstacle which is encoded on the map.

28. A method of controlling an autonomous cleaner comprising a body, and at least one driving wheel assembly to drive the body the at least one driving wheel assembly having a driving wheel, a driving motor to drive the driving wheel and a housing accommodating the driving wheel and the driving motor, the method comprising:

detecting, by a sensor, a displacement of the driving wheel corresponding to a reference position by sensing a gap distance between the sensor and a sensor target, the sensor target provided to be movable with the driving wheel inside the housing, determining, by one or more processors, material quality or condition of a floor surface according to the displacement of the driving wheel;

controlling a driving of the autonomous cleaner according to the determined material quality or the condition of the floor surface;

determining whether the displacement of the driving wheel is within a predetermined reference range; and changing the driving course of the autonomous cleaner such that the displacement of the driving wheel is within the reference range when the determined displacement of the driving wheel is out of the reference range.

29. The method of controlling the autonomous cleaner of claim 28, wherein the controlling the driving of the autonomous cleaner comprises adjusting the torque or the rotation frequency of the driving wheel according to the determined material quality or the condition of the floor surface.

* * * * *